Figure 1:
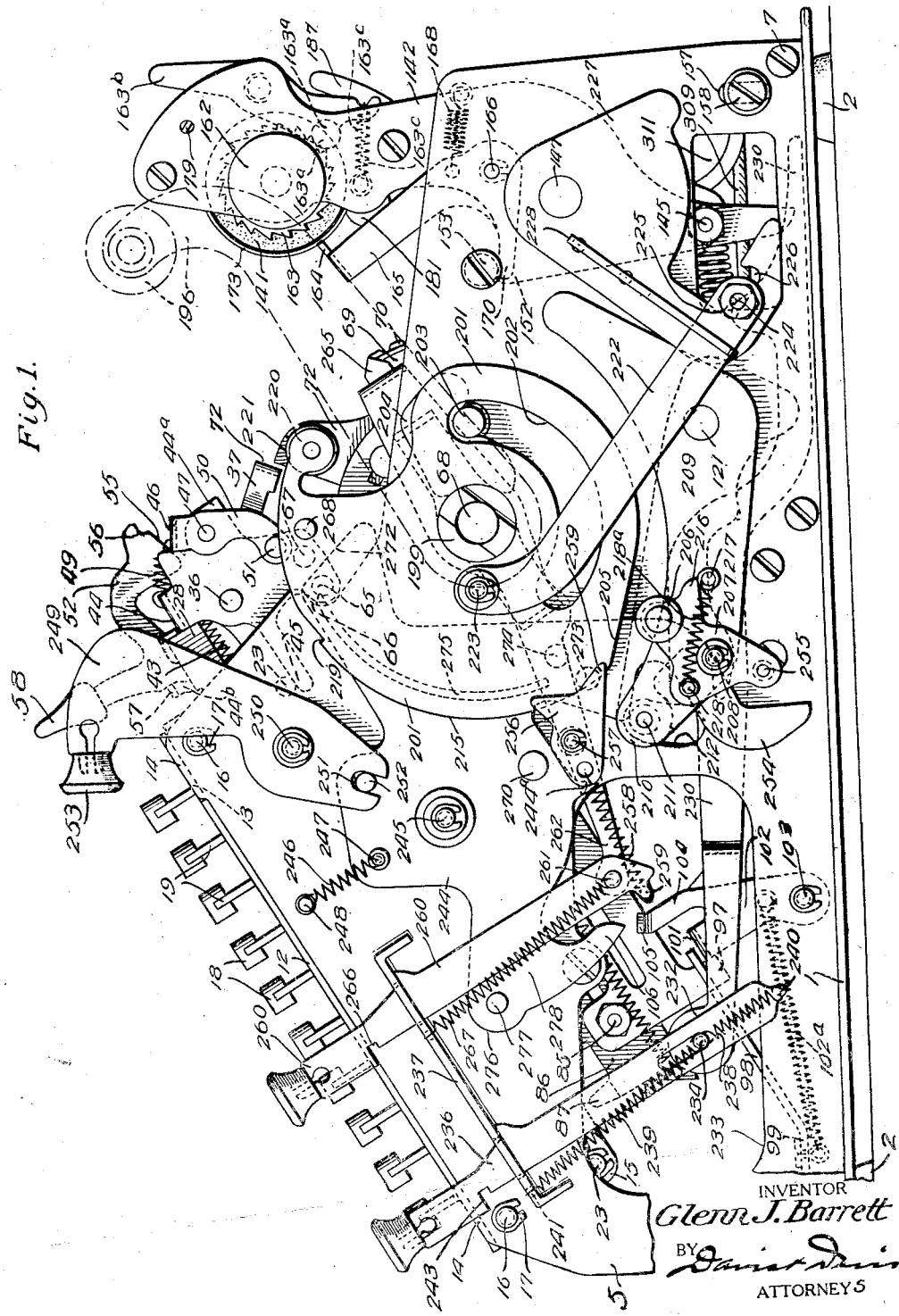

June 30, 1931.  G. J. BARRETT  1,811,840
ADDING MACHINE
Filed Aug. 14, 1925   19 Sheets-Sheet 3

INVENTOR
Glenn J. Barrett
BY
ATTORNEYS

June 30, 1931. G. J. BARRETT 1,811,840
ADDING MACHINE
Filed Aug. 14, 1925 19 Sheets-Sheet 4
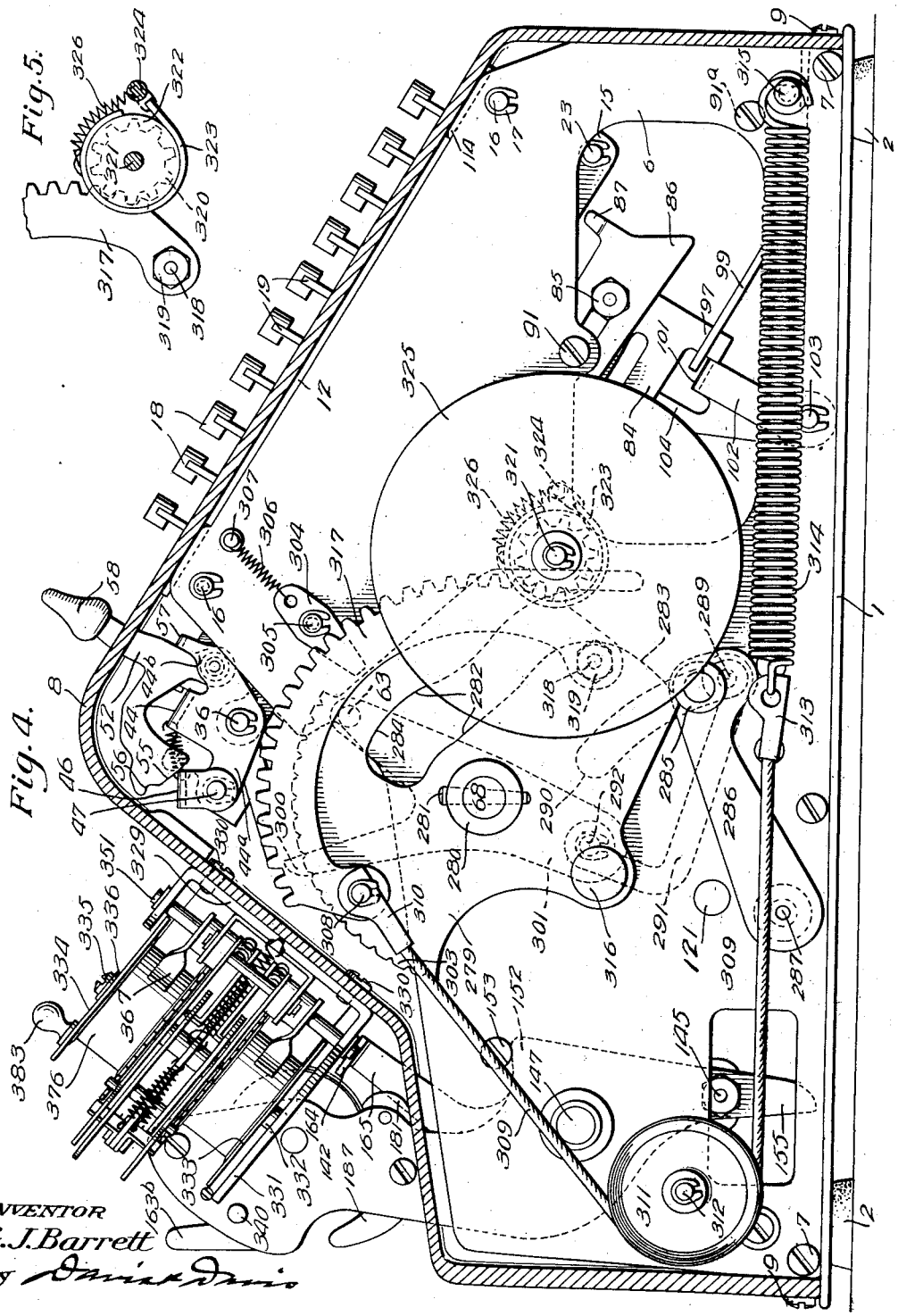
INVENTOR
G. J. Barrett June 30, 1931.  G. J. BARRETT  1,811,840
ADDING MACHINE
Filed Aug. 14, 1925   19 Sheets-Sheet 5

INVENTOR
Glenn J. Barrett
BY
ATTORNEYS

INVENTOR
Glenn J. Barrett
BY
ATTORNEYS

June 30, 1931. G. J. BARRETT 1,811,840
ADDING MACHINE
Filed Aug. 14, 1925 19 Sheets-Sheet 7

INVENTOR
Glenn J. Barrett
BY
ATTORNEYS

June 30, 1931.  G. J. BARRETT  1,811,840
ADDING MACHINE
Filed Aug. 14, 1925  19 Sheets-Sheet 8
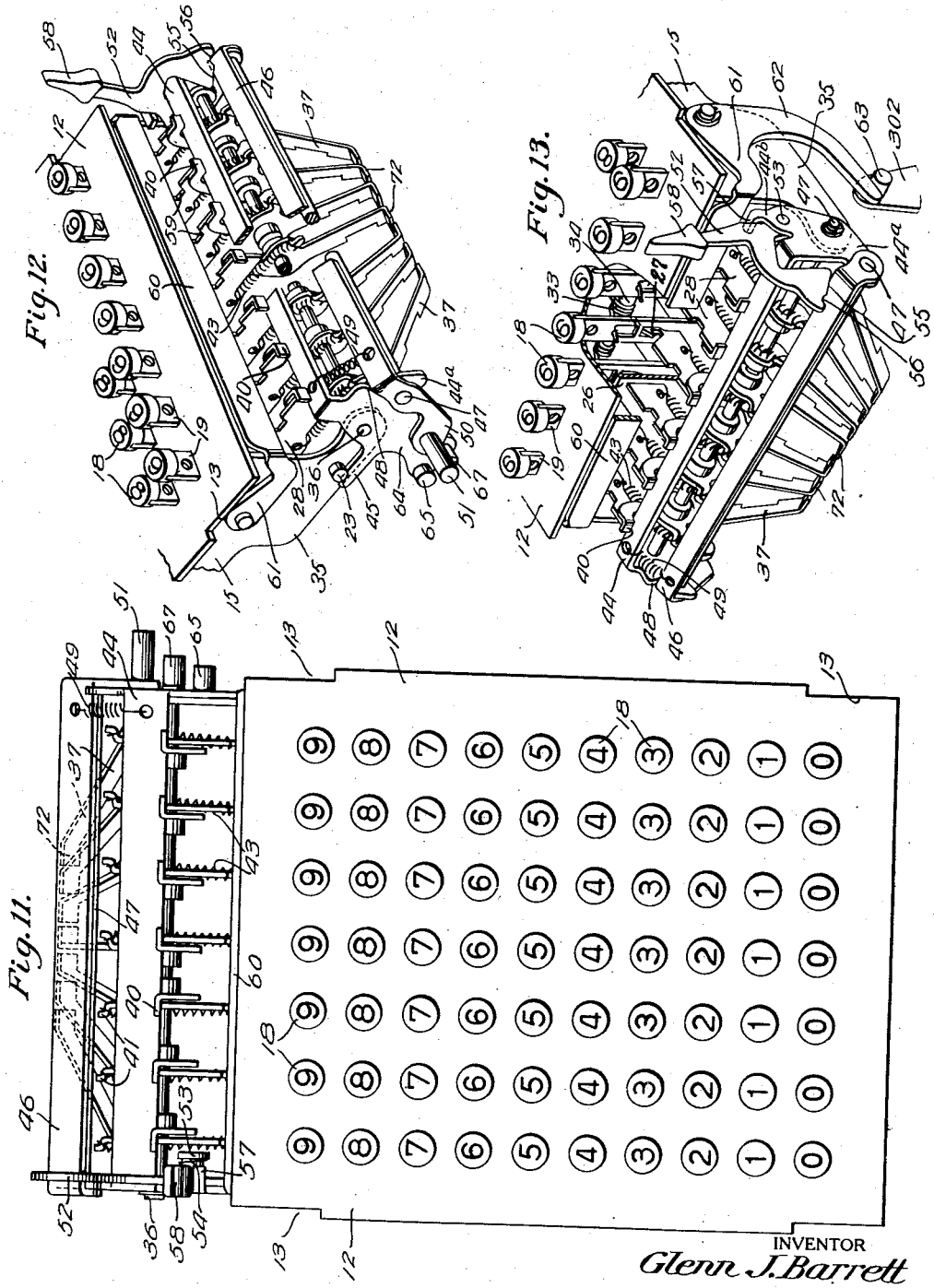
INVENTOR
Glenn J. Barrett
BY
ATTORNEYS

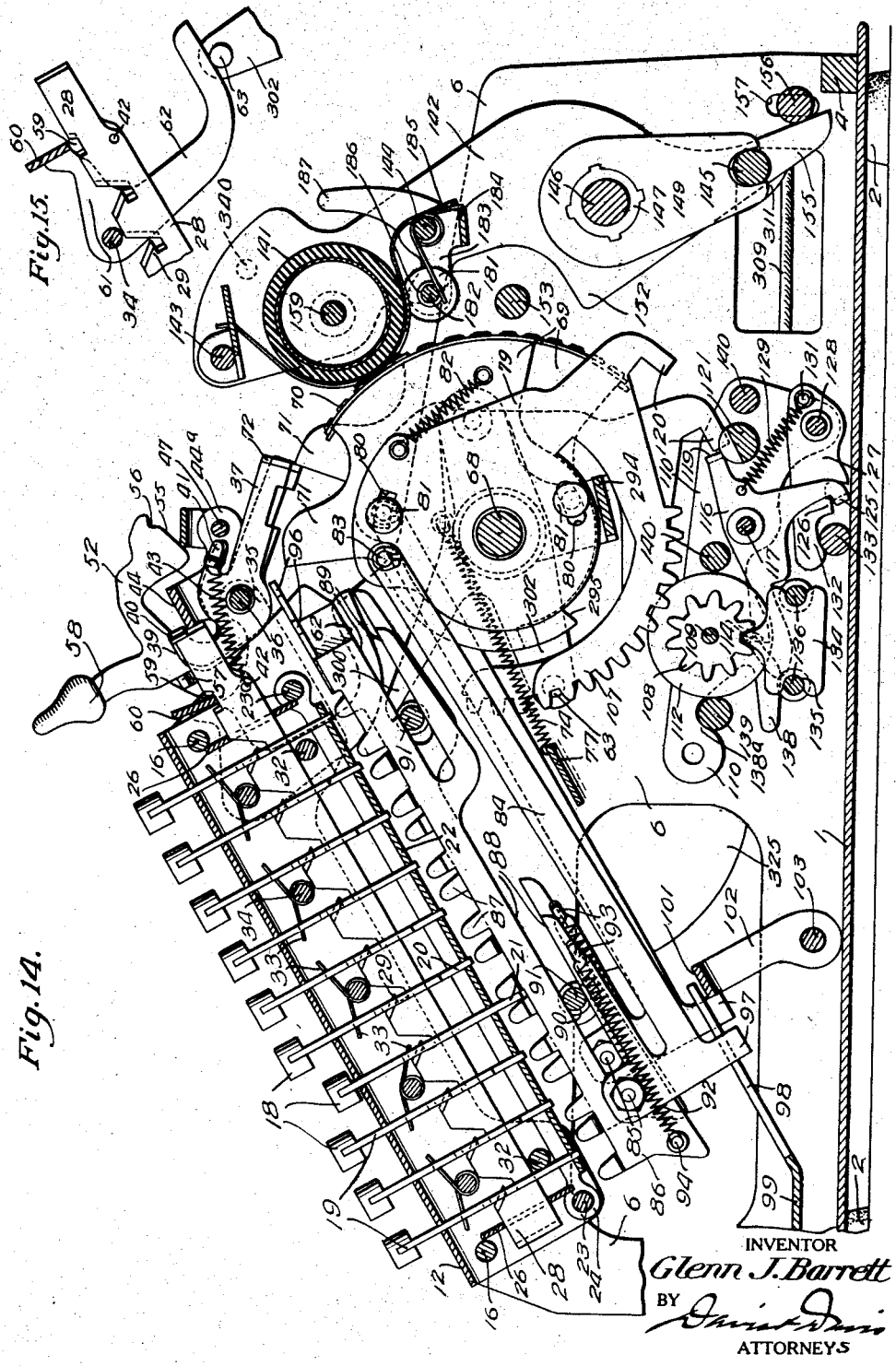

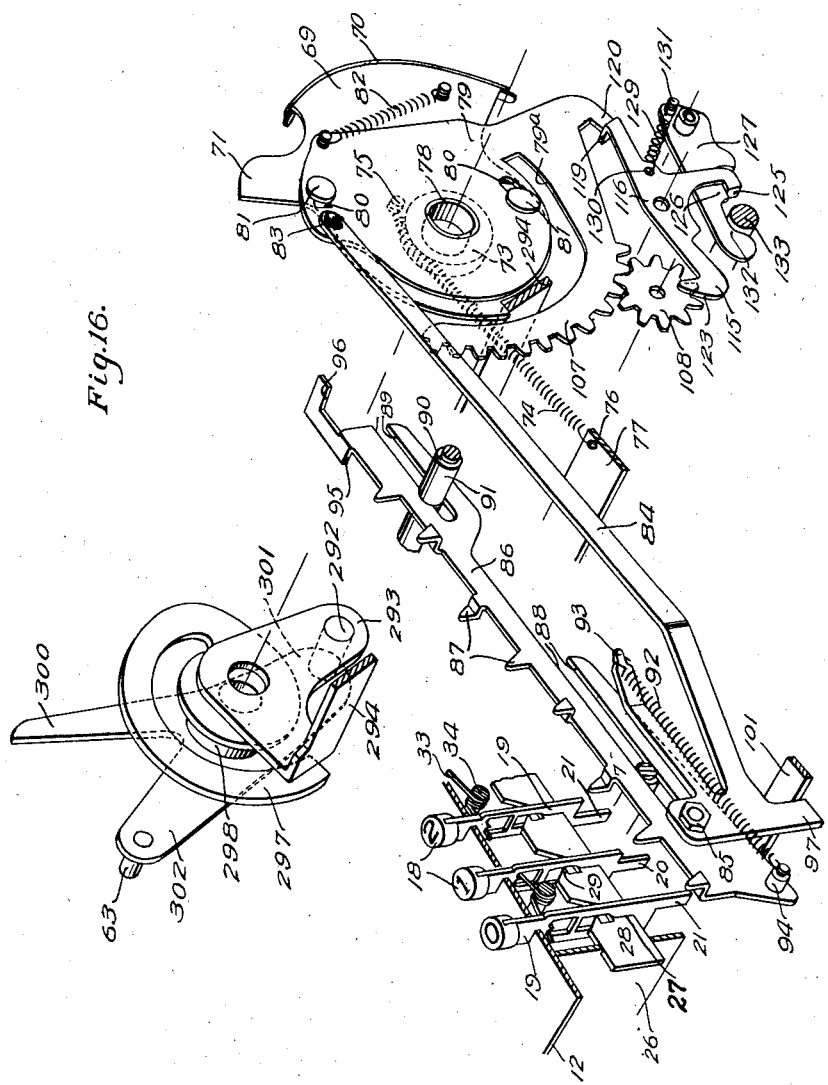

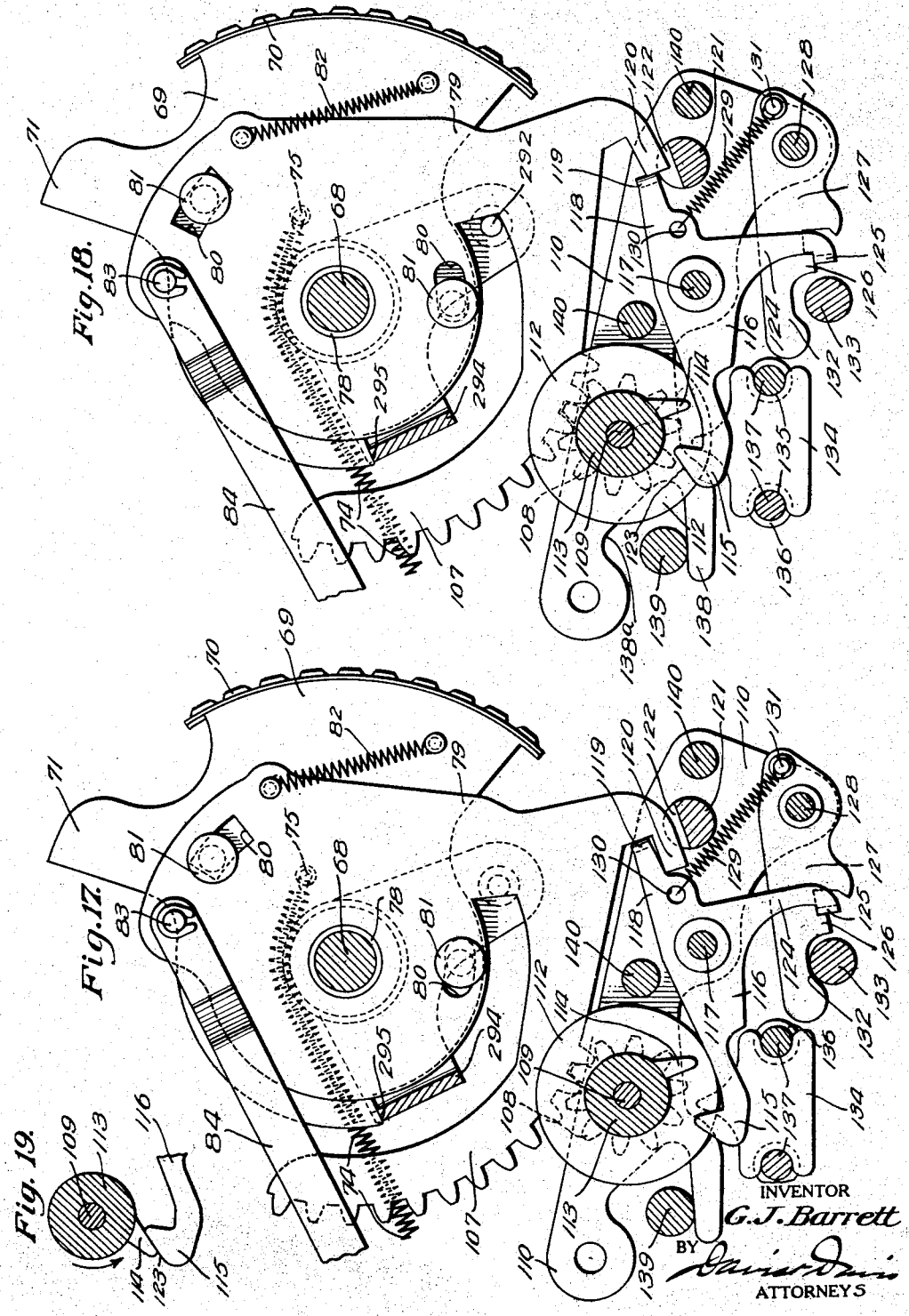

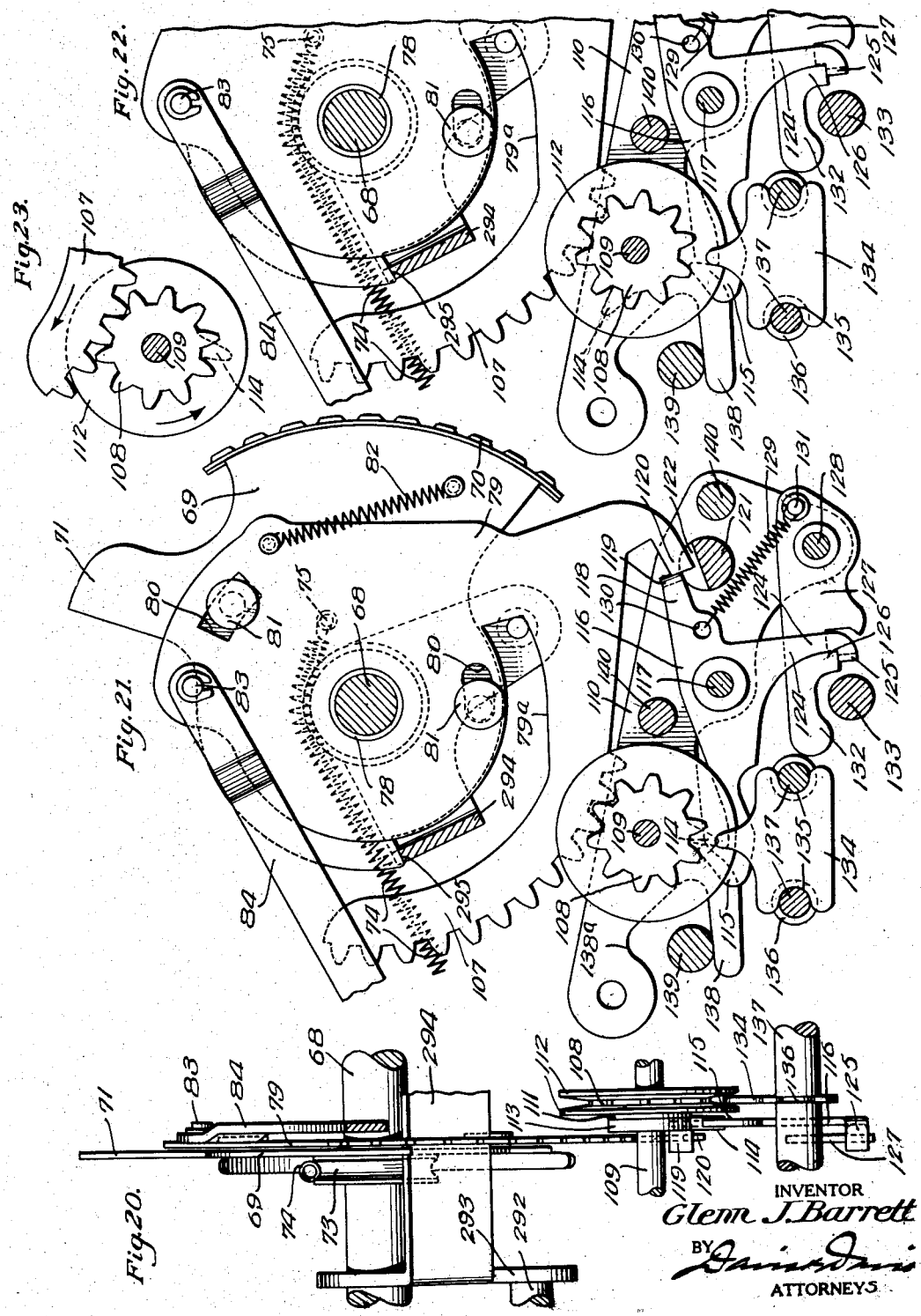

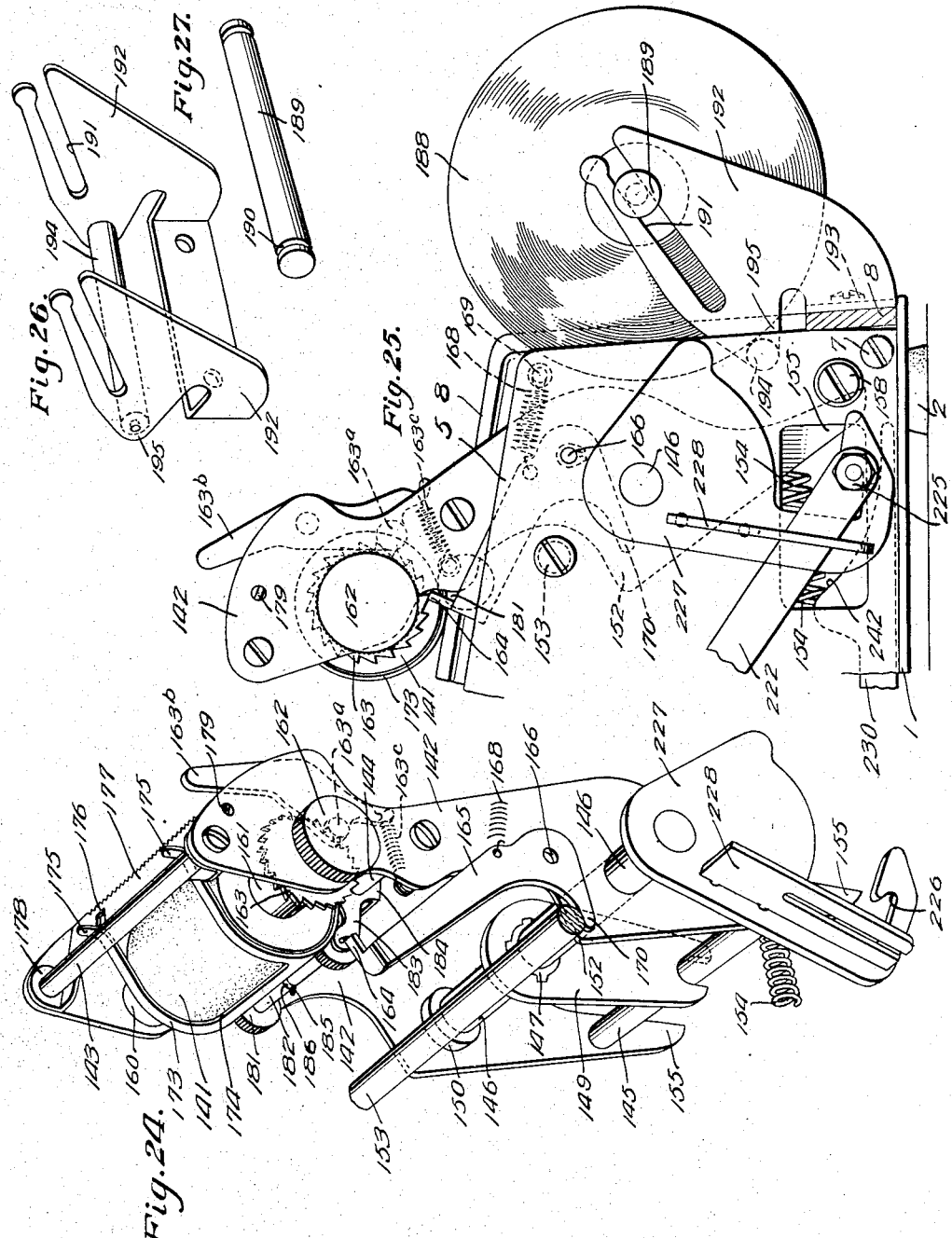

June 30, 1931.  G. J. BARRETT  1,811,840
ADDING MACHINE
Filed Aug. 14, 1925    19 Sheets-Sheet 14
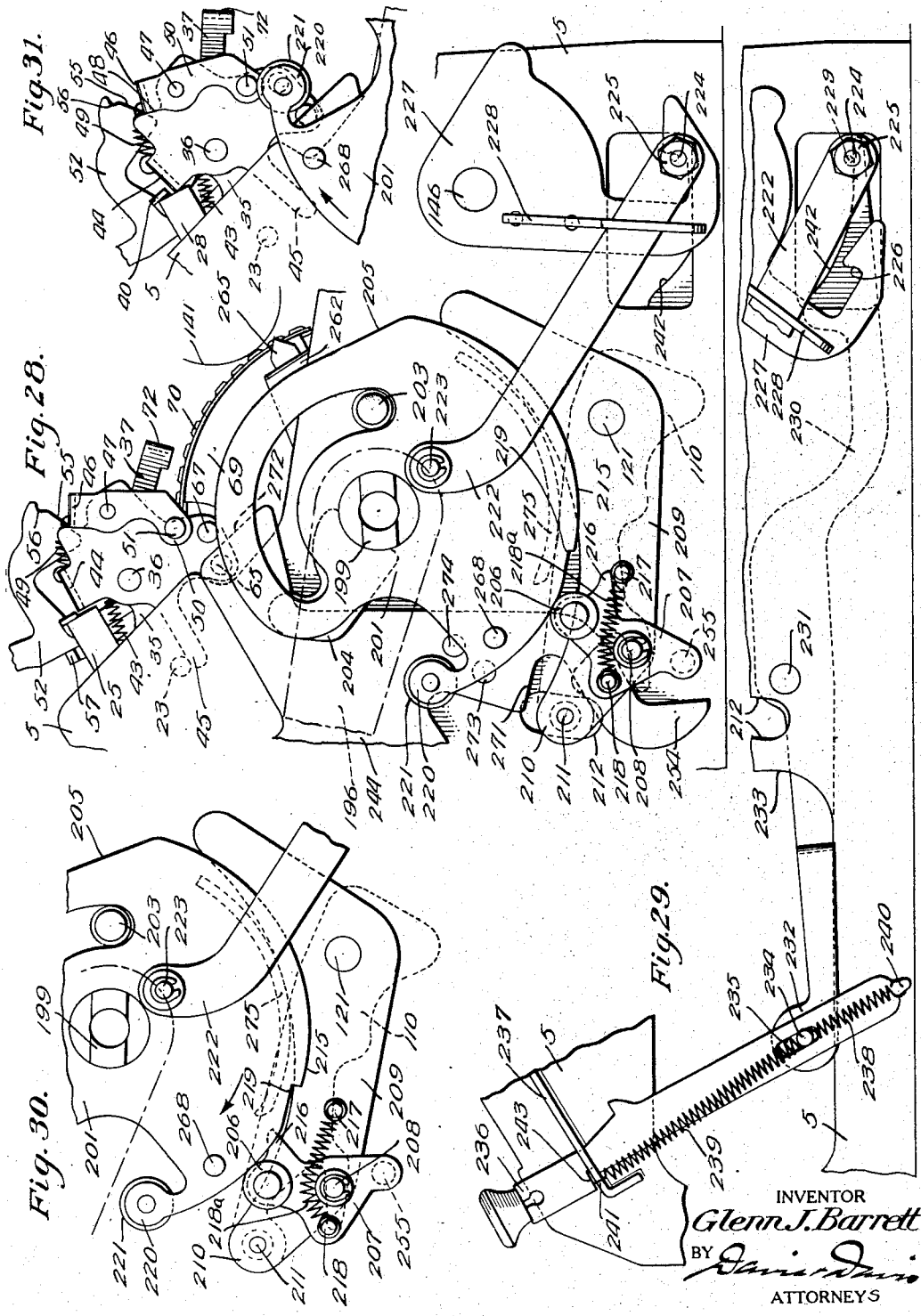
INVENTOR
Glenn J. Barrett
BY
ATTORNEYS

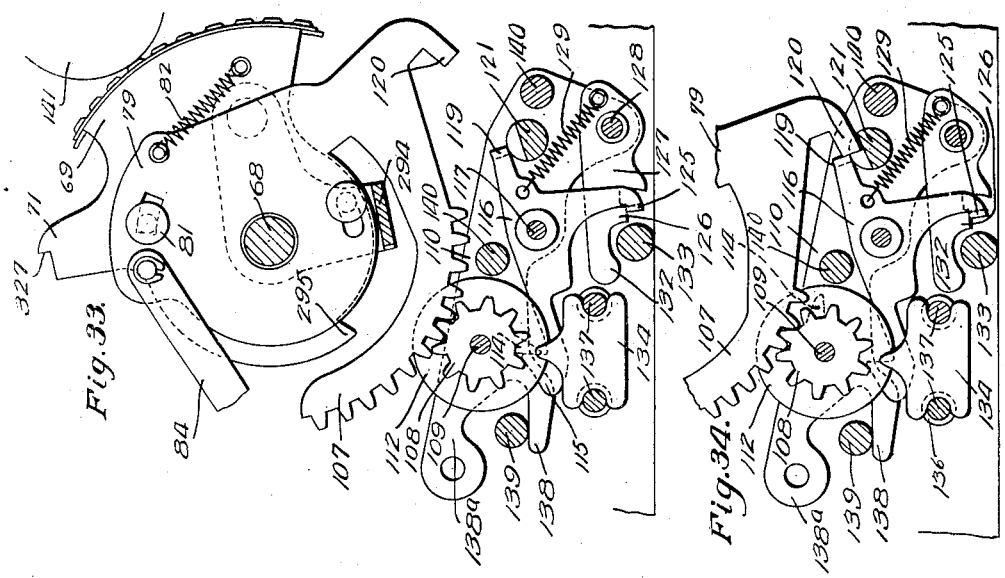
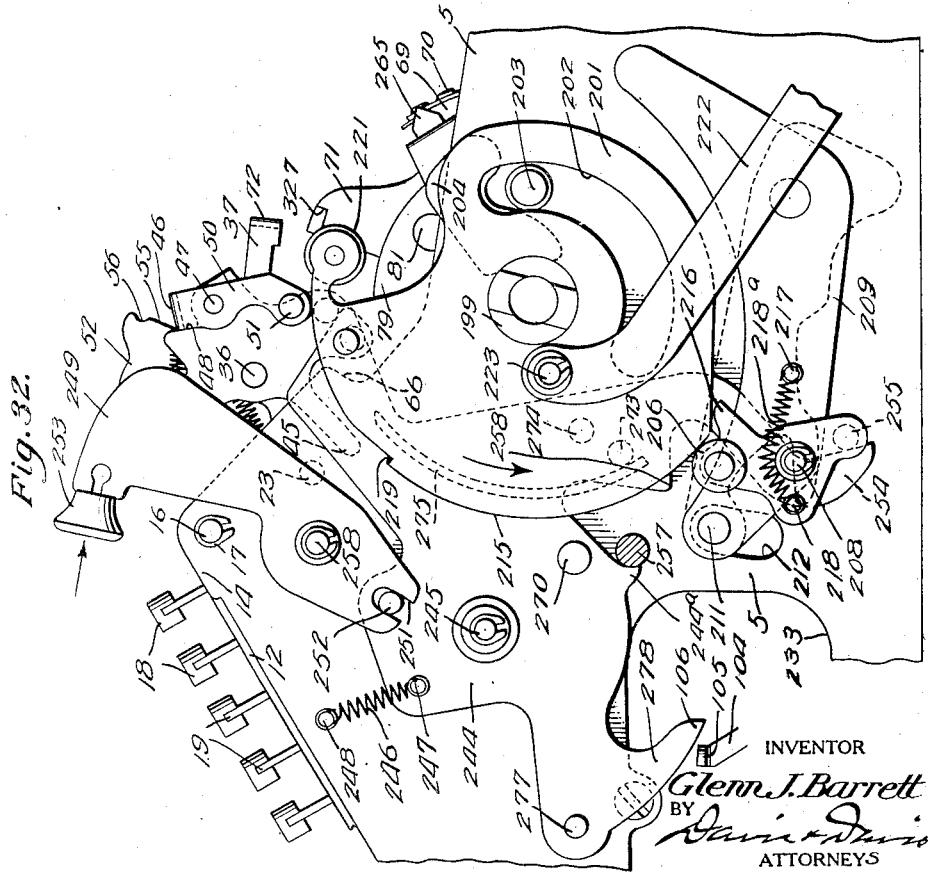

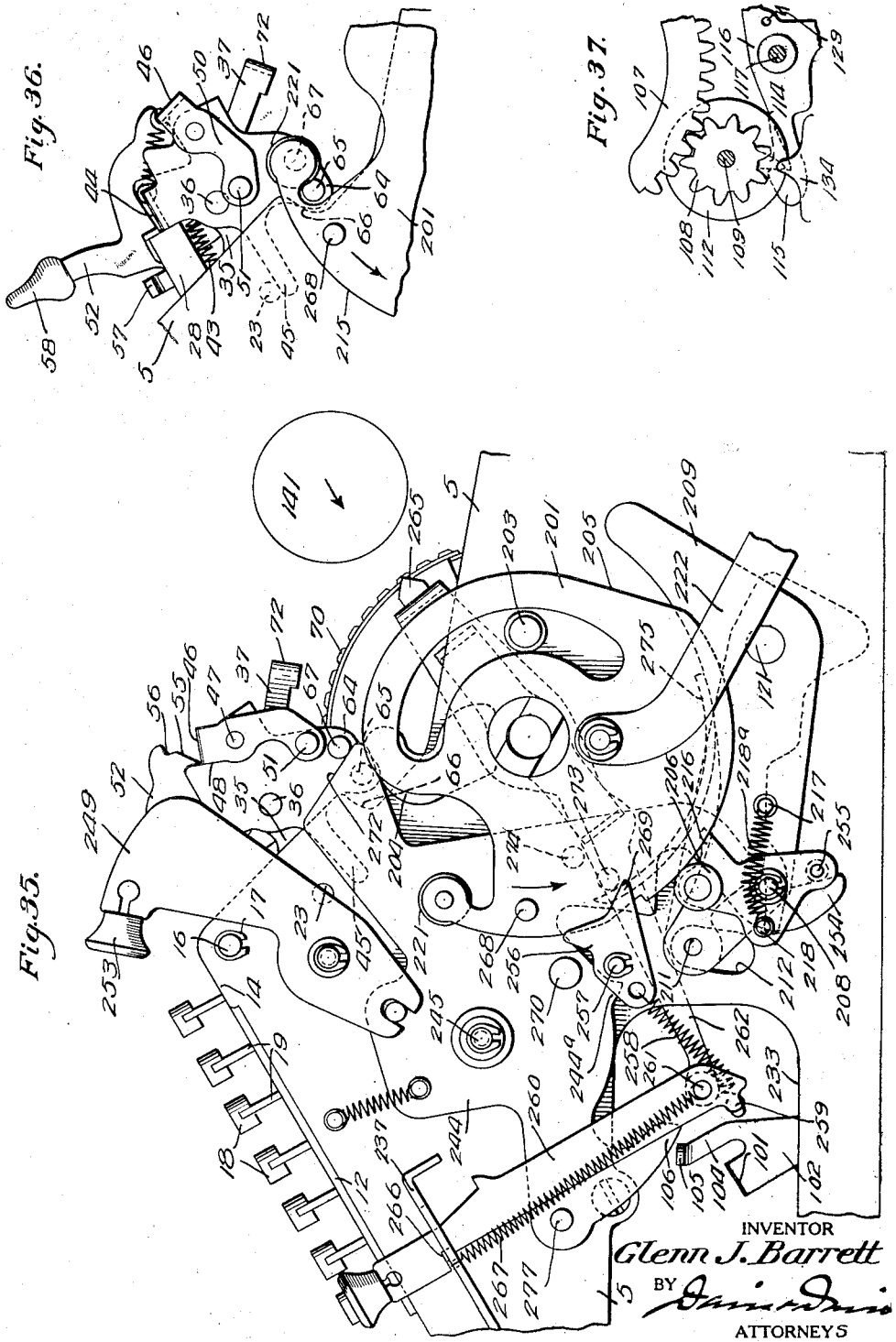

June 30, 1931.   G. J. BARRETT   1,811,840
ADDING MACHINE
Filed Aug. 14, 1925   19 Sheets-Sheet 17
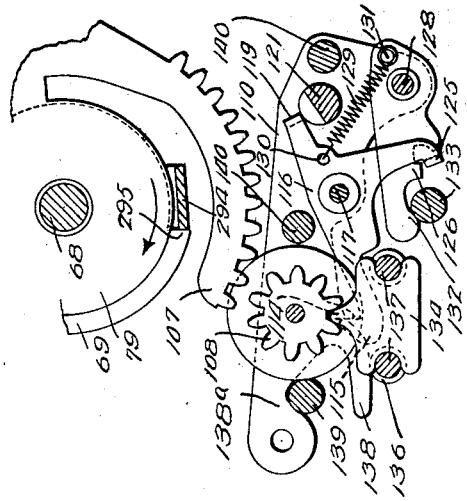
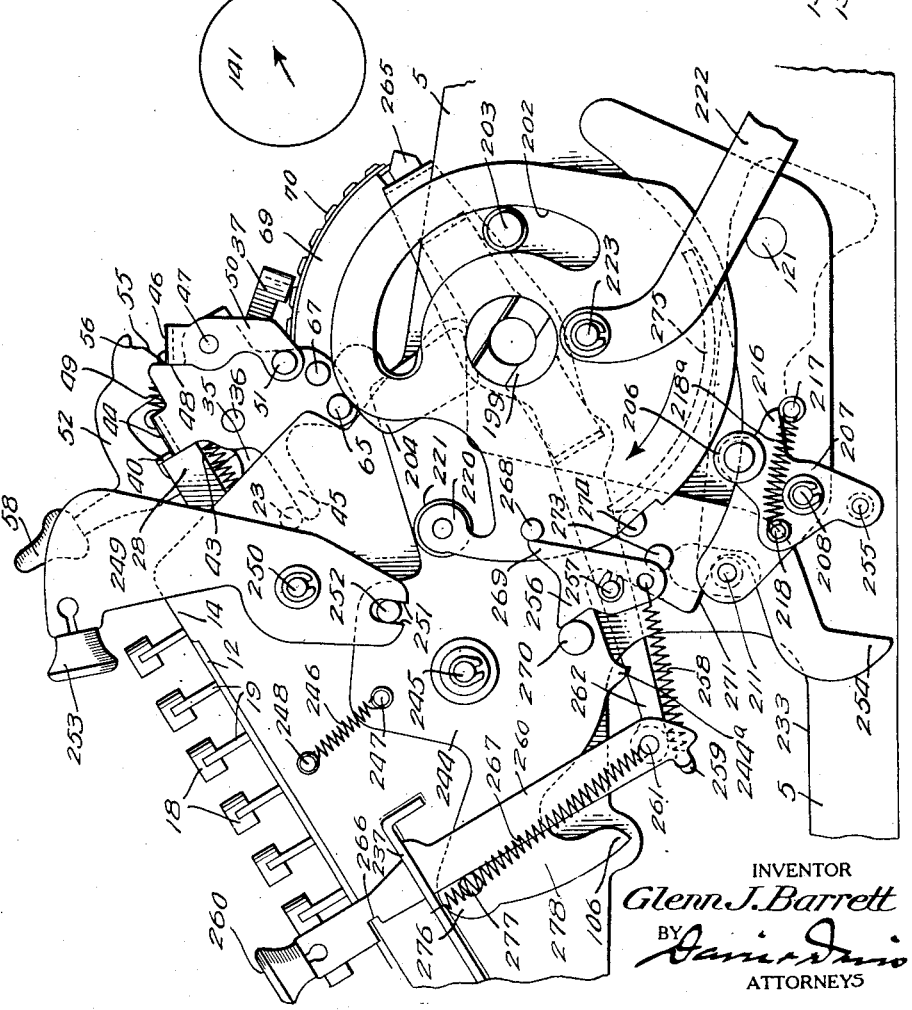
INVENTOR
Glenn J. Barrett
BY
ATTORNEYS

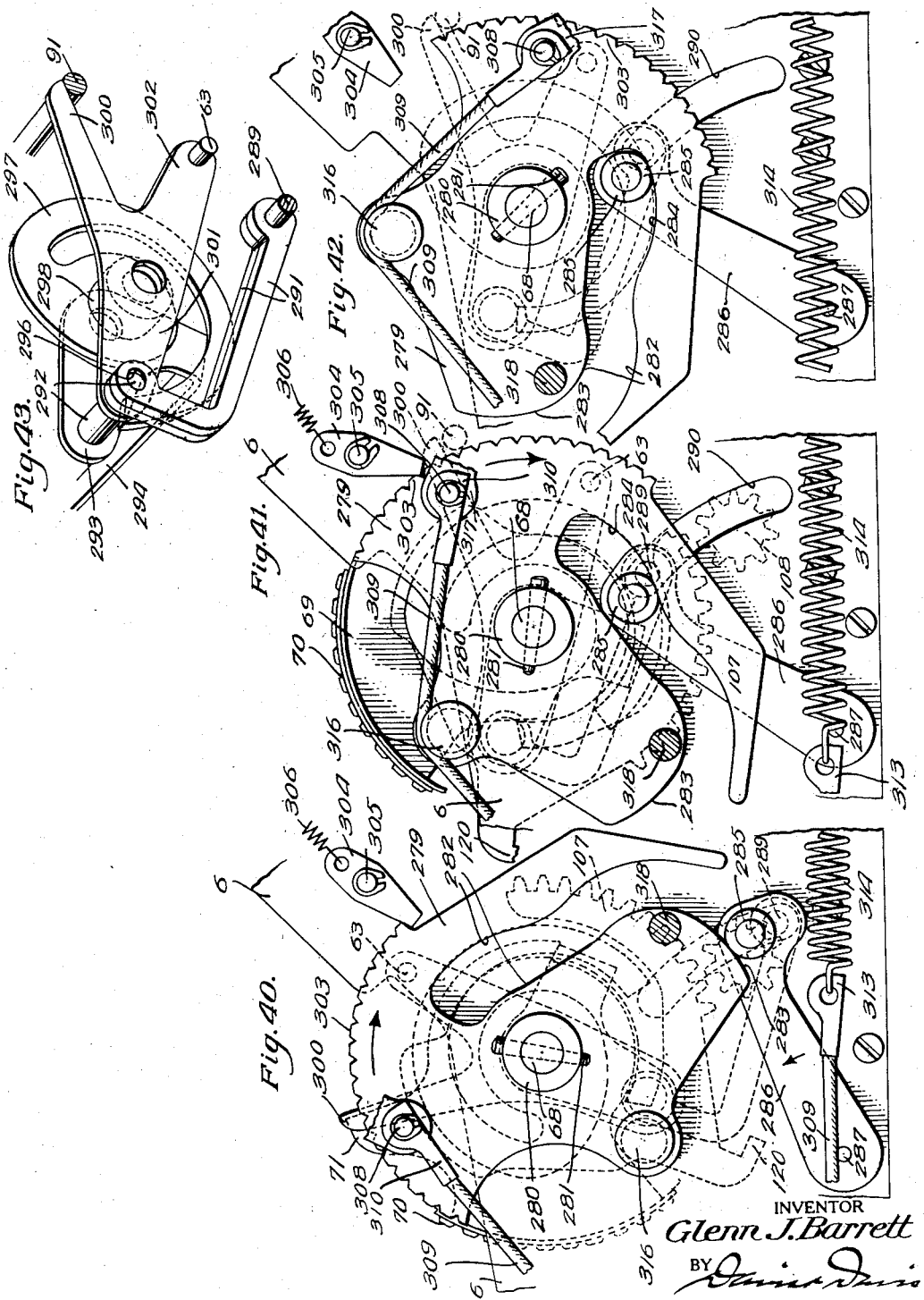

June 30, 1931.  G. J. BARRETT  1,811,840
ADDING MACHINE
Filed Aug. 14, 1925   19 Sheets-Sheet 19
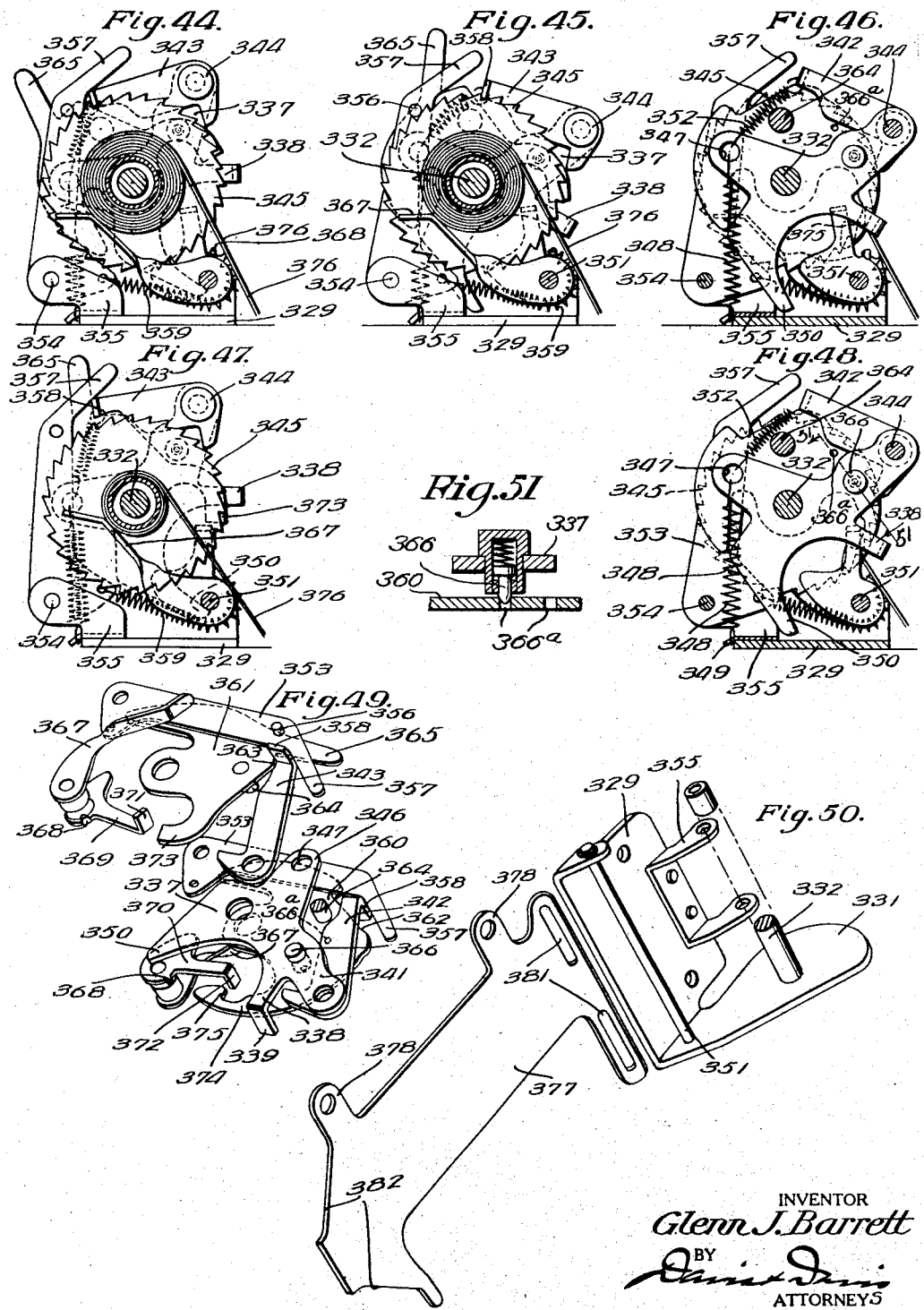

Patented June 30, 1931

1,811,840

UNITED STATES PATENT OFFICE

GLENN J. BARRETT, OF EVANSTON, ILLINOIS, ASSIGNOR TO PORTABLE ADDING MACHINE COMPANY, OF CHICAGO, ILLINOIS, A CORPORATION OF ILLINOIS

ADDING MACHINE

Application filed August 14, 1925. Serial No. 50,219.

This invention relates more particularly to various improvements in the details of construction of a key-set adding machine, which enables me to build a portable machine adapted to perform all the essential functions of the larger types of commercial adding and listing machines and to carry out substantially all the special feature operations controlled by special keys. The various mechanisms in my present improvement are much simplified in construction as compared with prior machines now on the market, and the entire machine is made lightweight and compact, although the various parts are of sturdy construction, so as to produce a highly satisfactory perfectly practical commercial machine, which can be sold at a reasonable price.

In developing my improved machine, various novel structural arrangements have been incorporated and the object has been to maintain simplicity of construction with absolute reliability in operation, and, at the same time, eliminate, as far as possible, complicated mechanical movements and thereby reduce the number of parts, which, it will be understood, makes for low cost production.

One object, therefore, has been to improve the key-board unit and particularly to condense the key-board by using smaller key caps, which enables me to place the keys closer together without interfering with the ease of operation of the key-board. Furthermore, the entire key-board unit is preferably so constructed and assembled that it may be readily removed from the machine frame and my key-board unit includes many associated parts which ordinarily are mounted in the main frame of the machine and, therefore, not removable with the key-board. Structurally, the object has been to arrange all of the associated elements carried by the keyboard unit, so that no positive connections are required between the various mechanisms of the keyboard unit and the mechanisms with which they cooperate in the body of the machine, such cooperating parts being subject to contact engagement only.

A further object has been to improve and simplify the key control of the adding units and to so arrange the key controlled stop slides, which are spaced apart the distance between and for cooperation with the respective rows of keys, that they are connected by means of intermediate links with the corresponding adding sectors and the latter are arranged in more condensed form, so that the spacing therebetween will correspond with the spacing of the printed numbers. In this connection, an important improvement has been incorporated which comprises a resilient connection between the respective links and stop slides, which will permit restoration of the adding sectors, without injury to the machine, in case of accidental depression of a key prior to the complete restoration of the stop slides to normal position.

A further object has been to improve the recording or listing mechanism by the direct association of type segments with the respective adding sectors and utilizing the type segments as driving elements connected by pin and slot connections with the adding sectors to permit relative movement therebetween to the extent of one unit for transfer of the tens. The adding sectors and type segments are connected together by means of springs for effecting relative movement therebetween in the transfer of the tens.

The type segments associated with the respective adding sectors are, therefore, mounted in condensed form, corresponding to the spacing between the printed numbers, and each segment is provided with fixed type representing the numerals to be printed. The type are faced radially outward and mounted concentrically of the main shaft, about which the type segments and associated adding sectors are adapted to rotate. A further object is to provide an improved pressure printing platen adapted to be moved into cooperative printing relation with the type segments for printing the successive numbers to be added and the associated mechanisms include various novel features, particularly in connection with the line spacing and ribbon feed mechanism, which are adapted to be operated as incident to the movement of the platen toward and from the type segments.

A further object is to improve the method of pressure printing by a direct toggle link or pitman connection with the handle and provide means under the control of a key for interrupting the connection between the handle and the platen rock frame, to thereby provide a simple non-print mechanism.

A further object, in connection with the transfer mechanism, is to provide for mounting the carrying or transfer pawls and their associated latch pawls on the accumulator unit, so that they are movable bodily therewith, thereby avoiding displacement of the accumulator or register wheels when the accumulator unit is shifted relative to the adding sector.

The adding sectors and associated type segments are rotatably mounted upon the main shaft, to which the operating handle is secured, and the pick-up or resetting bail is pivotally mounted on the main shaft for cooperation with the driving elements or type segments for restoring the adding units to normal position. A special feature of my improved mechanism is that the throw of the pick-up bail on the forward stroke of the handle is such that the bail is adapted to restore any adding sectors that have been released for transfer of the tens during a previous operation. In connection with this operation of the pick-up bail, a further object of my improvement is to provide a resilient finger connected with the main shaft for positively moving the bail for its full forward throw, which is adapted to be limited by a suitable stop mechanism. This is essential, so as to provide clearance for the free reengagement of the transfer pawls.

A further object is to simplify the control of handle operated mechanisms, particularly in the mechanism controlling the movement of the accumulator unit with reference to the adding sectors. For this purpose, a simple cam disc and friction roller mechanism is provided, the friction roller being mounted upon a pivoted lever in such a manner that upon the forward stroke the register wheels are moved out of mesh with the adding sectors and, upon the return stroke of the handle, the roller will be automatically moved out of effective position, thereby permitting the restoration of the register wheels for cooperation with the adding sectors.

A further object is to improve the total or sub-total mechanism and simplify the construction thereof, so that when the total key is operated, the friction roller cooperating with the control cam, previously referred to, will be thrown out of operative engagement so as to permit taking the total, and, upon the return stroke of the handle, the total will be retained in the machine, and may be subject to further accumulations, as is customary with a sub-total.

A further object is to provide an improved mechanism for preventing operation of the total key after performing additions involving transfer of the tens until an idle stroke of the handle has been made, this being essential in order to restore any adding sectors which have been displaced.

When it is desired to "clear" the machine at the time the total is taken, it is desirable to indicate such clearing operation by a printed character on the strip of paper and, therefore, a further object of my improvement is to provide a clearing key, adapted to be operated in conjunction with the total key, for predetermining the clearing operation when the handle is operated and, associated with said clearing key, there is provided a lever carrying a special character, adapted to be printed on the strip of paper opposite the total, to indicate that the total clearing operation has been performed.

In machines of this type, where there is a preliminary representation of the number to be added and all of the operations of adding and printing are carried out upon the operation of the handle, which is returned to normal by means of a spring, it is desirable to control the movements of the handle and particularly its return movement. Therefore, a further object of my improvement is to provide a simple friction-brake-controlled governing device associated with the handle mechanism for effectively governing the return movement thereof.

As previously stated, a spring is usually employed for restoring the handle to normal position after the forward stroke, and a further object of my improvement is to provide a novel arrangement whereby the spring is operatively connected with the handle by means of a cord running over a pulley, the operating connections being such as to change the power arm and direction of the application of the power to the handle. One advantage of this arrangement is that it equalizes the pull of the spring and more effectually controls the operation of the control mechanism.

A further object is to improve the ribbon mechanism, which, in the present instance, is mounted upon the casing of the machine and is adapted to be actuated by the rock frame carrying the platen, as the latter is moved toward and from the type segments for the printing operation. In carrying out this feature of my improvement, it will be found that I have evolved a particularly novel and compact ribbon mechanism adapted to be operated entirely automatically, both as to the feed of the ribbon and the automatic reverse thereof, all of which operations are controlled by the platen rock frame, during the movement of the platen toward and from the type segments when the handle is operated.

Figure 2:
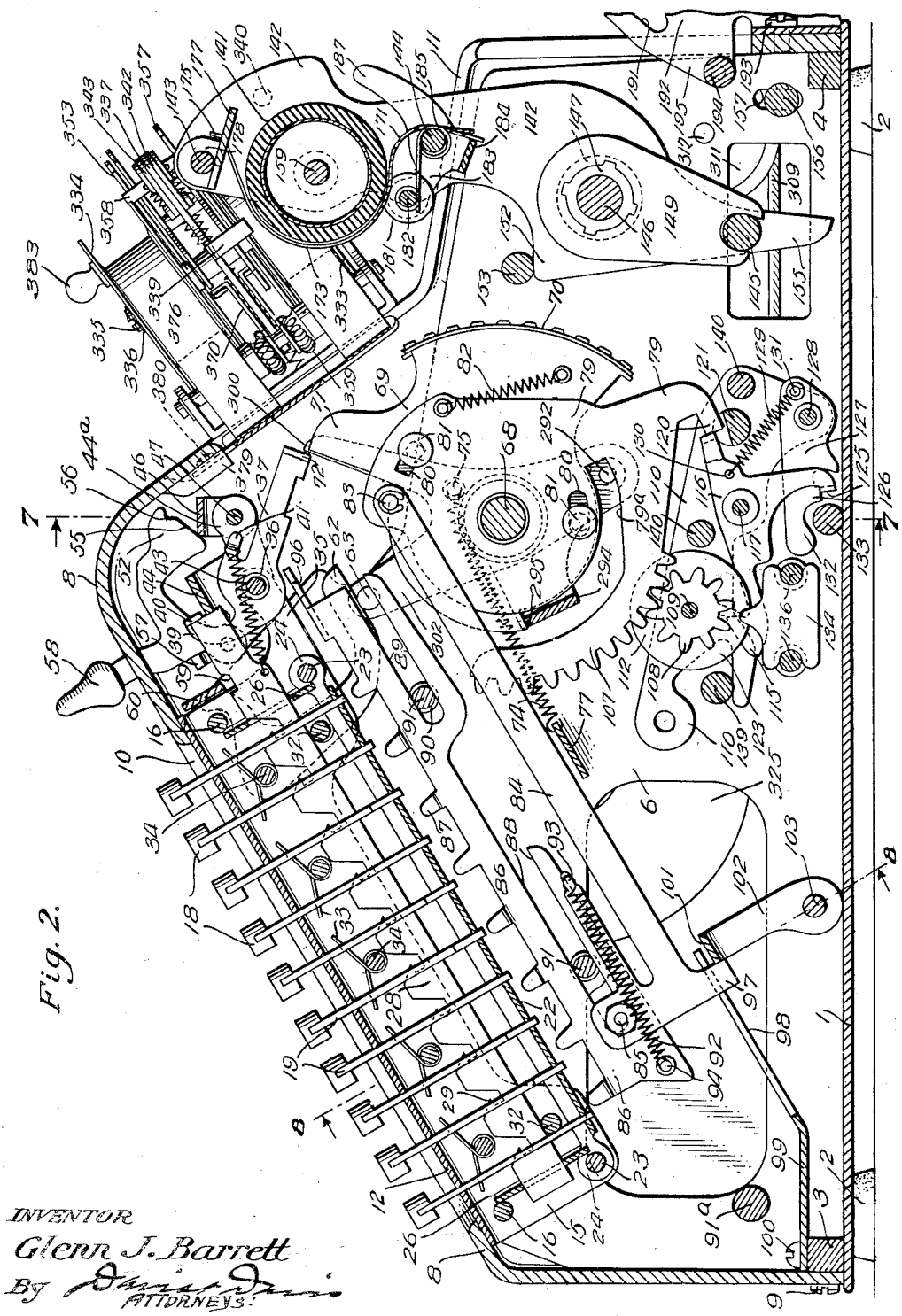
Figure 3:
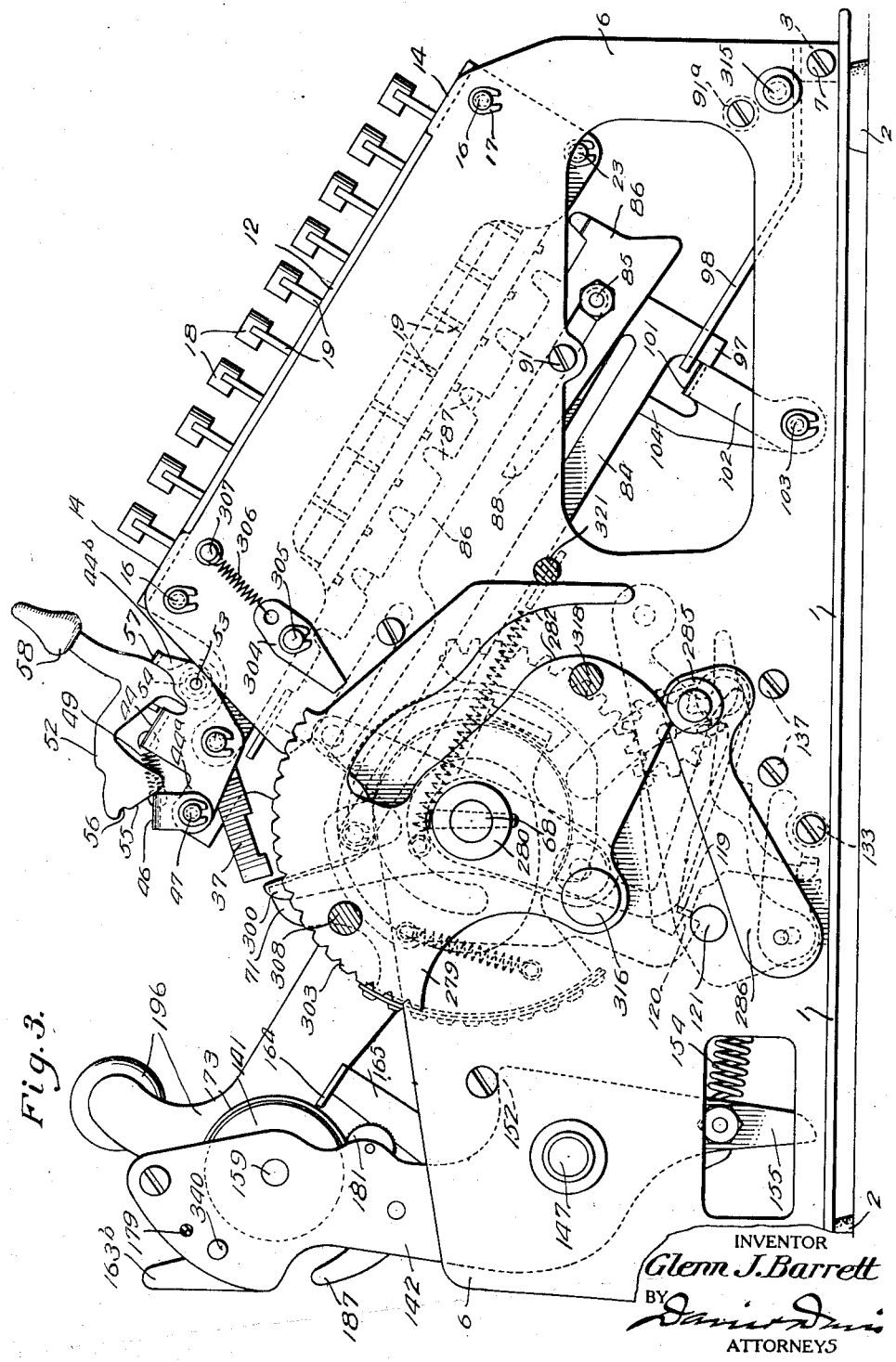
Figure 6:
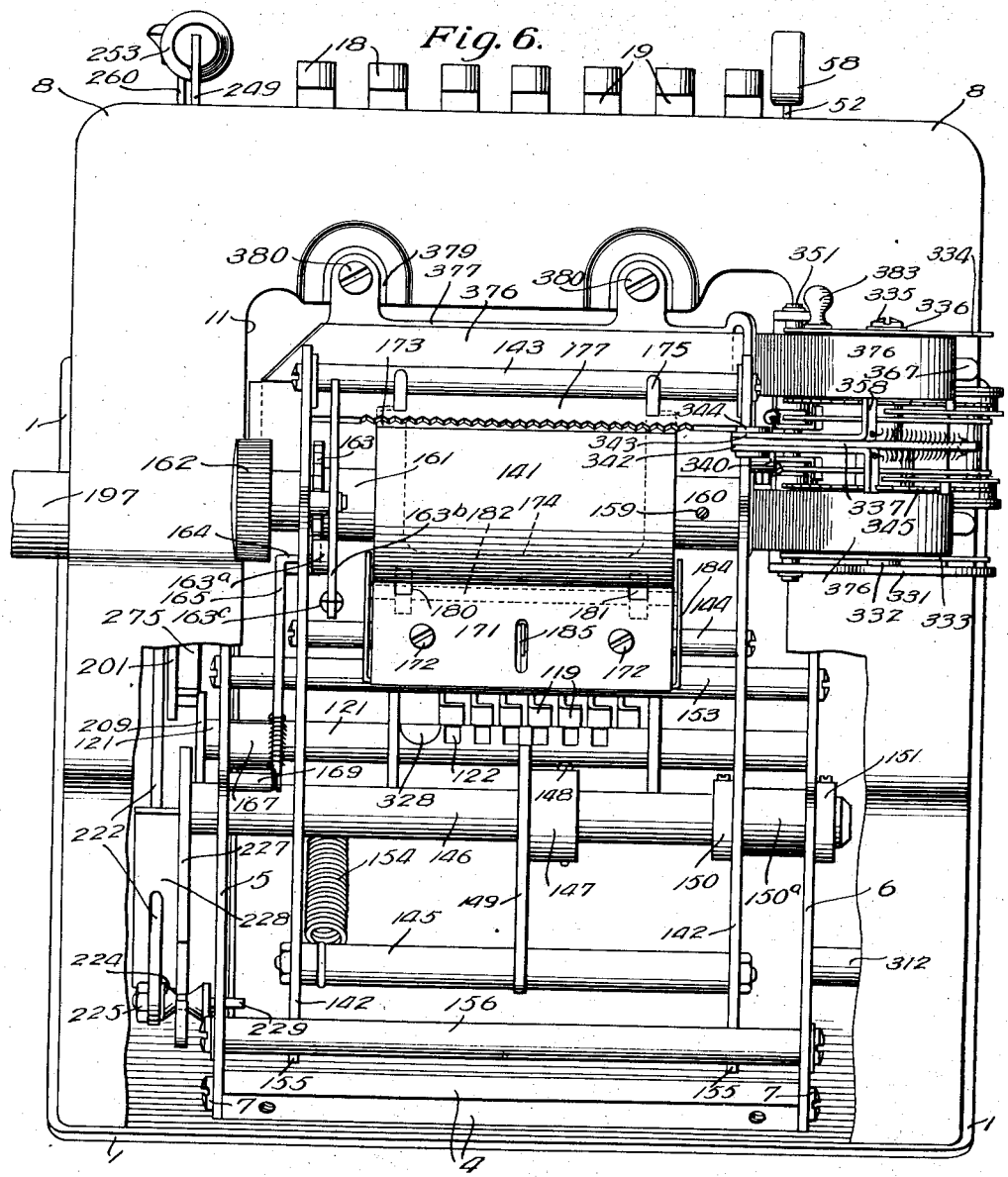
Figure 7:
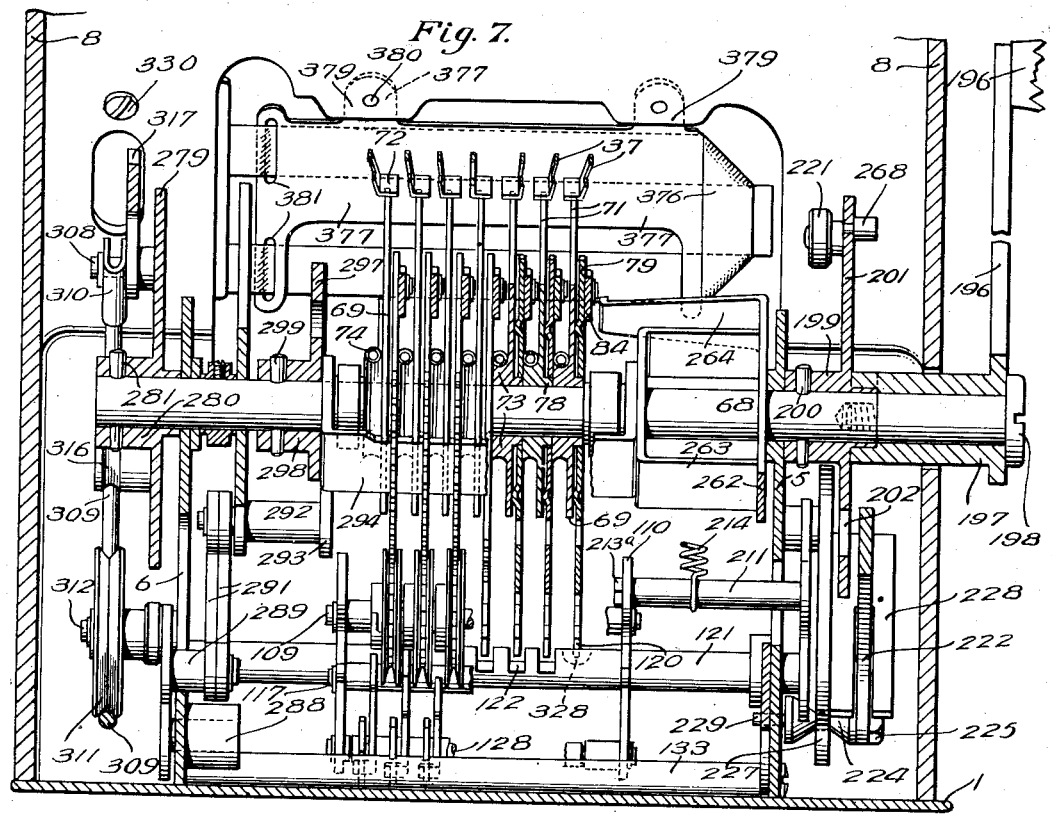
Figure 8:
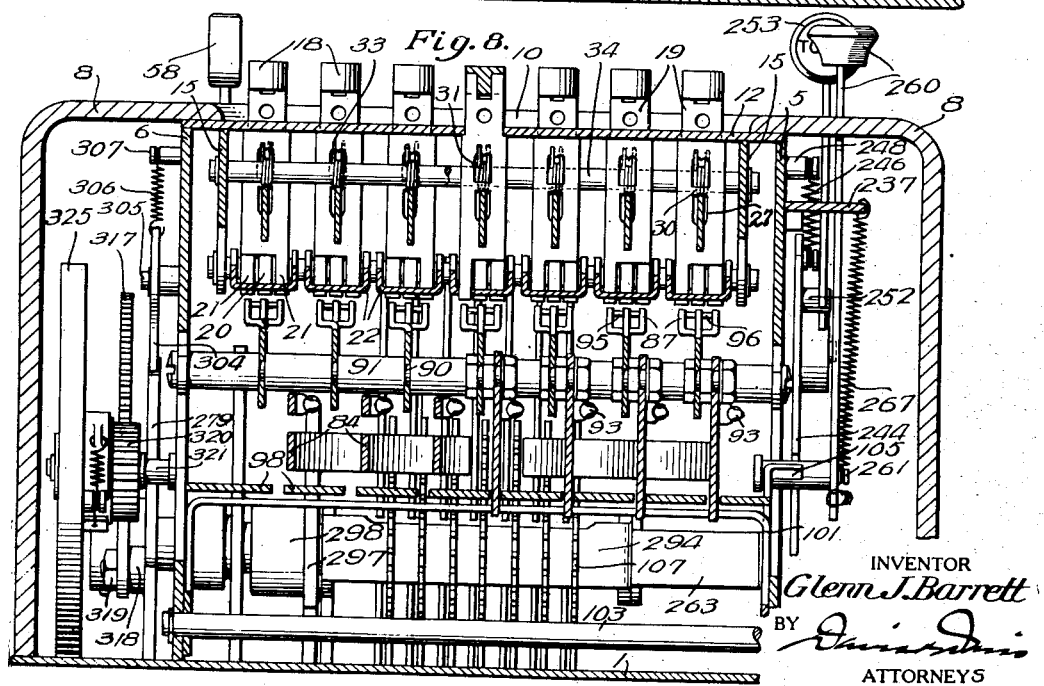
Figure 9:
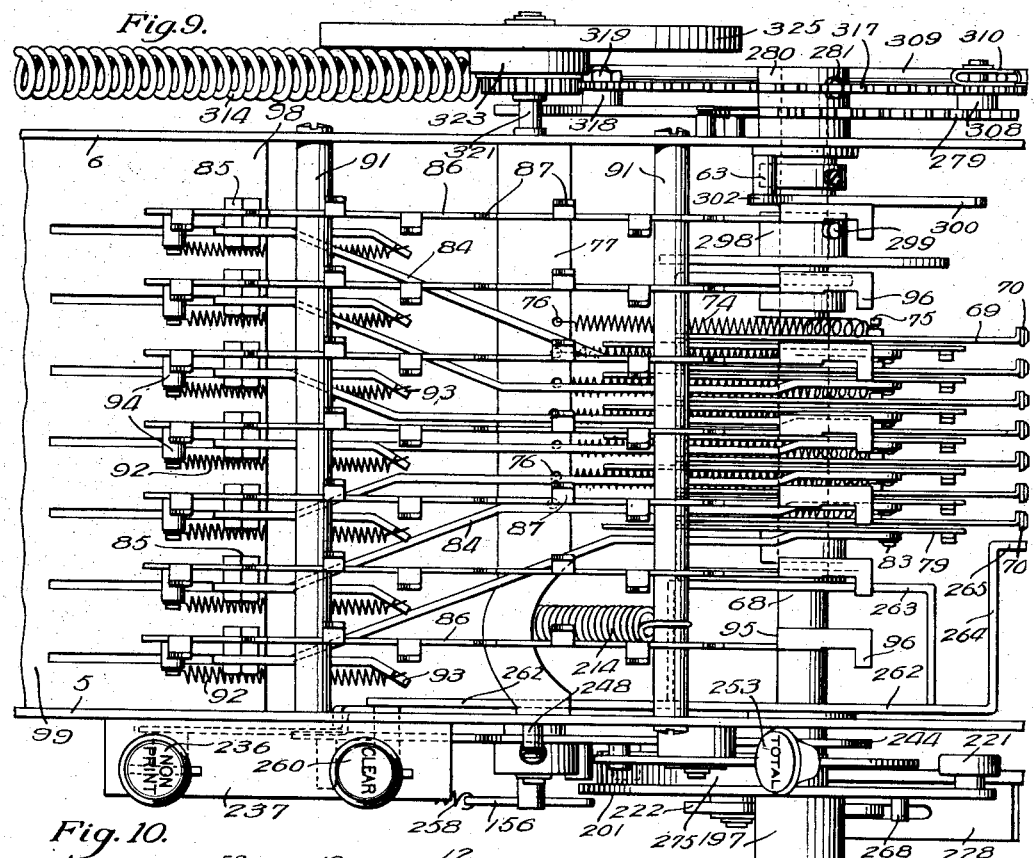
Figure 10:
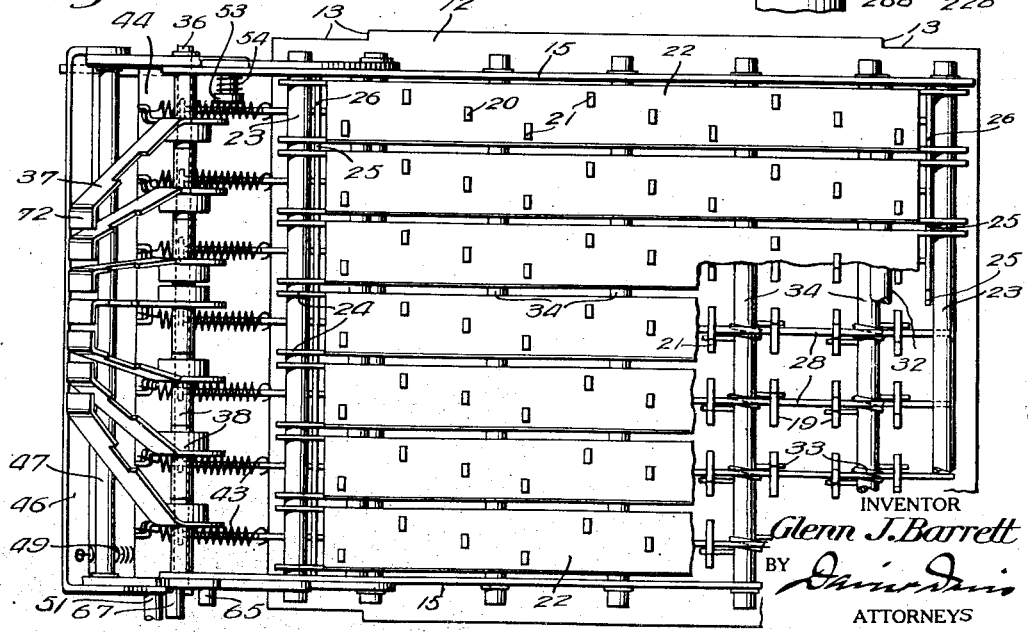

These and other objects and improved features of my machine will be more particularly referred to hereinafter in describing the details thereof. The preferred form of my improved key-set adding and listing machine is shown in the accompanying drawings, in which Fig. 1 is a side elevation of the machine, with the outer casing removed, as viewed from the right side; Fig. 2 is a longitudinal vertical section, substantially through the center of the machine; Fig. 3 is a side elevation of the machine with the outer casing removed, as viewed from the left side; Fig. 4 is a similar side elevation, looking from the left side with the outer casing in place and showing the mounting of the ribbon mechanism; Fig. 5 is a detail of the friction brake associated with the governor; Fig. 6 a rear view of the machine substantially perpendicular to the printing plane with part of the cover casing broken away and the operating parts positioned as in Fig. 14; Fig. 7 is a transverse vertical section through the machine, substantially on the line of the main shaft (7—7 of Fig. 2), part of the mechanism being shown in front elevation; Fig. 8 is a transverse section, substantially at right angles to the plane of the keyboard on the line 8—8 of Fig. 2, a part of the section being off-set to bring out certain details; Fig. 9 is a top plan view of a portion of the machine with the keyboard unit removed; Fig. 10 is a bottom view of the keyboard unit partially broken away; Fig. 11 is a top plan view of the keyboard unit; Fig. 12 is a perspective of the rear of the keyboard unit, showing the right side thereof; Fig. 13 is a rear end perspective of the keyboard unit showing the left side thereof; Fig. 14 is a vertical longitudinal section, showing the relation of the parts on the forward stroke of the handle; Fig. 15 is a detail view of the operating end of the locking bail for the key latch strips; Fig. 16 is a perspective view of a single line of elements associated with the adding units, and also details of the pick-up bail; Fig. 17 is an enlarged view of the adding unit in position for transfer of the tens; Fig. 18 is a similar enlarged view with the parts in normal positions; Fig. 19 is a detail of a transfer trigger in position to operate the transfer pawl; Fig. 20 is a front elevation of an adding unit, associated with an accumulator unit; Fig. 21 is an enlarged view similar to that shown in Fig. 18, with the register wheel in zero position; Fig. 22 is a similar view to that shown in Fig. 21, after a number has been added; Fig. 23 is a detail view of the adding sector rack operating on the register wheel during addition; Fig. 24 is a perspective view of the platen rock frame and its operating lever; Fig. 25 is a broken away side elevation of the rear part of the machine, showing the platen rock frame operating connections and the roll-paper holder; Fig. 26 is a perspective view of the roll-paper holding bracket; Fig. 27 is a perspective view of the rod for supporting a roll of paper in the bracket shown in Fig. 26; Fig. 28 shows a broken away view in the control mechanism on the right side of the machine, at the end of the forward stroke of the handle; Fig. 29 shows the non-print key in depressed position and the position of the link at the end of the forward stroke of the handle; Fig. 30 shows the handle operated cam disc engaging the friction roller, as the handle is starting on its return movement; Fig. 31 is a fragmentary view of the control mechanism, illustrating the key-latch strip-release in operation; Fig. 32 represents a partial view of the right side of the machine, illustrating the position of the parts when the total key is moved and the handle started on the forward stroke; Fig. 33 is a fragmentary sectional view showing the adding units and accumulators at the end of the forward totaling stroke; Fig. 34 is a fragmentary view showing the position of the register wheels or accumulators at the beginning of the stroke for taking the total; Fig. 35 is a view of the right side of the machine, illustrating the position of the parts when the total and clearing keys are set and the handle is operated on the forward stroke; Fig. 36 is a fragmentary view, illustrating the operation of the repeat key; Fig. 37 is a fragmentary view of a register wheel and adding sector rack at the forward end of the total clearing stroke; Fig. 38 indicates the position of the parts on the right side of the machine during the return stroke of the handle, in the clearing operation; Fig. 39 shows a fragmentary cross section, indicating the position of the adding sectors and accumulators and the parts shown in Fig. 38; Fig. 40 shows the handle operated slotted cam, viewed from the left side of the machine, which is adapted to reciprocate the pick-up bail for the adding units, this view also showing the full stroke mechanism, the parts being in normal position; Fig. 41 shows the parts shown in Fig. 40, as they would be positioned about midway of the forward stroke of the handle; Fig. 42 shows the relation of the same parts at the end of the forward stroke of the handle; Fig. 43 is a perspective view showing the details of the pick-up bail operating connections;

Fig. 44 a top plan view of the ribbon mechanism, partly broken away through the upper spool, showing the actuating arm of the dog carrier in its normal rear position and the feed-reversing mechanism in position for causing winding of the ribbon upon the upper spool;

Fig. 45 a view similar to Fig. 44 but showing the actuating arm of the dog carrier in its forward position, as at the end of the forward stroke of the operating handle of the machine, ready for effecting a feed movement of the ribbon on the return stroke;

Fig. 46 a top plan view of the ribbon mechanism with the parts above the dog carrier broken away and the dog carrier positioned as in Fig. 45;

Fig. 47 a view similar to Fig. 44, showing the reversing mechanism set to reverse the direction of feed on the next forward stroke of the actuating arm of the dog carrier to cause winding of the ribbon from the lower spool on to the upper spool;

Fig. 48 a view similar to Fig. 46, showing the reversing mechanism set to reverse the direction of feed on the return stroke of the actuating arm of the dog carrier to cause winding of the ribbon from the upper spool onto the lower spool;

Fig. 49, a perspective view of parts of the ribbon reversing mechanism detached;

Fig. 50 a perspective view of the ribbon mechanism supporting means and the ribbon guide detached from the casing; and Fig. 51 a detail view of the detent means for locking the feed reversing cams to rock with the dog carrier.

Referring to the drawings and particularly to Figs. 1 to 4, it will be seen that the machine is provided with a base plate 1, to which rubber feet 2 are preferably secured, the base plate being, in the present instance, formed of thin sheet metal. This base plate is provided with two transversely extending rectangular bars 3 and 4 near the front and rear ends of the machine, as indicated in Fig. 2 of the drawings. Frame side plates 5 and 6 are secured to the ends of the respective transverse bars 3 and 4 by suitable screws 7, the frame plate 5 being on the right side of the machine and the frame plate 6 on the left side. The frame plates 5 and 6 are adapted to support the entire mechanism of the machine, except the ribbon mechanism, which, as hereinafter explained, is secured to the cover casing 8. The casing 8 is adapted to enclose the machine and is held in place by screws 9, entering the transverse bars 3 and 4, substantially as indicated in Fig. 2. The side plates 5 and 6 preferably extend along the base plate 1 to support certain transverse rods and shafts, hereinafter referred to. The upper edges of the side plates incline upwardly and rearwardly at an angle of approximately 30° to the horizontal, thereby conforming to the plane of the keyboard, which is supported thereby as hereinafter pointed out. The upper edges of the side plates drop to a lower level back of the keyboard, the arrangement being such as to bring the side plates below the level of the printing segments and permit the platen frame to project, as hereinafter more particularly described.

The cover or casing 8 follows the outline of the side plates 5 and 6, except that its highest point is rounded and the rear portion inclines downward at an angle to the keyboard and lies in a plane parallel to the plane of the printing points of the type segments and this inclined portion is adapted to support the ribbon mechanism and ribbon guide in position for the ribbon to cooperate between the platen and type segments. The casing 8 is provided with a rectangular opening at 10 to expose the keyboard and an opening 11 in the rear downwardly inclined portion thereof is adapted to provide for the movement of the platen and the passage of the paper from the paper roll to the platen. The cover casing 8 is also provided with suitable openings for the various special keys, such as repeat, total, clearing and non-print. The key caps of the special keys are preferably detachable, so that when they are removed the cover casing can be readily removed by simply taking out the screws 9, which secure the casing to transverse base bars 3 and 4.

*Keyboard unit.*—The keyboard unit, which is removably attached to the front upwardly inclined portions of the side frame plates 5 and 6, is more particularly shown, detached from the machine, in Figs. 10, 11, 12 and 13. It comprises a top plate 12, the lateral edges of which are provided with notches 13 adapted to cooperate with dovetail lugs 14 on the respective frame side plates 5 and 6, as indicated in Fig. 1. This notch and lug mounting not only helps hold the keyboard unit in place but is adapted to position it in the machine in proper relation for the parts to cooperate with the adding unit and control mechanism. The top plate 12 of the keyboard unit is riveted or otherwise secured to side plates 15, which extend downward from the underside thereof, as indicated in Fig. 8 of the drawings, and are adapted for the support of various associated parts of the keyboard unit. Removable rods 16, extending transversely through the frame side plates 5 and 6 and the side plate 15 of the keyboard unit, are adapted to secure the keyboard unit in place on the side plates of the machine, as indicated in Figs. 2 and 3 of the drawings. The rods 16 as well as other similar transverse rods are preferably held in place in the frame by sealing clips 17 forced into annular grooves in the ends of the rods, as indicated in Fig. 3.

The keyboard comprises a plurality of rows of keys from zero to nine inclusive, provided with key caps 18 of relatively small diameter, secured to the upper ends of key stems 19, which pass through suitable transverse slots in the top plate 12 of the keyboard unit, as indicated in Figs. 2 and 8. In my improved construction, the key caps 18 are made smaller in diameter than in standard machines, so as to facilitate mounting the rows of keys, and the keys in each row, closer together, to thereby provide a condensed keyboard without interfering with the ease of fingering. The key stems 19 are preferably punched from sheet metal in two forms, one with a central tail or stop finger 20 and the other with a tail or stop finger 21, located at one edge, so that by reversing the latter type of keystems 19, the tails or stops 20—21 in each row of keys will be in three parallel lines, as indicated in Fig. 8. The lower tail ends of the keys 19 are supported in bridge strips 22, which are provided with three lines of perforations for the passage therethrough of the key stop fingers 20 and 21, as shown in Fig. 10 of the drawings. The bridge plates 22 which are U-shaped in cross section are preferably supported from the side plates 15 of the keyboard unit by transversely extending rods 23 passing through holes in the side plates and through holes in ears at the ends of the respective bridge plates. The bridge plates 22 are preferably held in proper spaced positions transversely of the keyboard unit, by notches 25 in transversely extending comb or guide plates 26, mounted respectively between the front and rear ends of the side plates 15 and supported therein, substantially as shown in Figs. 2 and 10 of the drawings.

The respective key stems 19 are provided with elongated central openings at 27, through which key latch strips 28 extend, the respective latch strips being provided with beveled notches and formed with latch dogs 29, cooperating with a detent 30, (see Fig. 8) formed in the respective keys 19 by another punched hole 31, above the opening 27. The latch strips 28 are properly spaced transversely of the keyboard unit by slidably mounting the ends thereof in slotted holes in the guide plates 26. The latch dogs 29 are beveled on their upper edges and provided with undercut notches adapted to engage the key cross bars 30, when the keys are depressed. When a key is depressed the latch strip will be moved toward the front of the machine until the cross bar 30 is engaged by the underside of the latch dog 29. In this manner, the keys are held in depressed or set position, but if, after a key is depressed, another key is depressed in the same row, the first key will be released and returned by its spring to normal position, thus forming a "flexible keyboard".

The undercut notches of the beveled latch dogs 29 are of shallow depth so that when the latch dogs engage the cross bars 30 of the keys, the latch strips 28 will not return fully to their original positions, thereby holding the associated stop levers (37) hereinafter referred to, out of engagement with the corresponding adding units.

The side plates 15 of the keyboard unit are preferably secured together, near their lower edges, by two stay rods 32, which are preferably riveted in place and located below the latch strips 28 in position to support the latter and permit free sliding movement thereof. In order to restore depressed keys to normal position, springs 33 are provided. These springs are preferably coiled about rods 34, extending transversely of the rows of keys, between alternate keys of the rows, and the ends of the springs extend in opposite directions, and are adapted to pass through the holes 31 in adjacent key stems 19. In this manner, a single spring is adapted to operate two keys, thereby reducing the number of springs required.

The side plates 15 of the keyboard unit are provided with rearwardly projecting arms 35 forming the support for a transversely extending shaft 36, lying below the rear ends of the latch strips 28, for supporting a plurality of stop levers 37, pivotally mounted thereon. The stop levers 37 are carried on hubs 38 (Fig. 10) which form spacing elements therebetween, on the shaft 36, and maintain the upper ends 39 of the levers in the same spaced relation as the latch strips 28 with which they are adapted to cooperate. The upper ends 39 of the stop levers 37 lie alongside the rear ends of the latch strips 28 and are provided with laterally projecting ears 40, which are adapted to engage with the ends of the latch strips, as indicated in Fig. 2. The stop levers 37 are also provided with rearwardly projecting fingers 41, between which and holes 42 in the respective latch strips 28, double acting springs 43 are connected for mutually holding the ears 40 in contact with the ends of the respective latch strips and for moving the latch strips toward the rear to effect latching of set keys or, when no keys are set, the spring will hold the latch strips 28 and stop levers 37 in normal position with the latter in position to engage the stops or detent teeth on the adding units.

The transversely extending rod or shaft 36, supporting the stops levers 37, forms the pivotal support for a yoke or rock bail 44, adapted to lie immediately back of the rear ends of the latch strips 28 and to limit the rearward movement of the latter under the action of their springs 43. The position of the bail 44 is determined by a forwardly extending arm 45 engaging the end of one of the bridge rods 23, see Fig. 12, thereby limiting the rearward movement of the bail 44 and of the latch strips 28, under the pressure of the springs 43.

The latch strip rock bail 44 is provided with rearwardly extending arms 44ª for pivotally supporting thereon a small auxiliary yoke or rock bail 46, pivoted on a shaft 47, as indicated in Figs. 2 and 3 of the drawings. The auxiliary bail 46 is normally held against a shoulder 48 on the right side of the latch strip bail 44, as shown in Figs. 28 and 31 of the drawings, by a spring 49, extending between the two bails, and the right end of the auxiliary bail 46 is provided with a depending arm 50, carrying a laterally extending pin 51, adapted to be engaged by a roller hereinafter referred to in connection with the handle mechanism, for operating the latch strip rock bail 44 to move all of the latch strips forward, and thereby release any set keys at the end of the return stroke of the handle.

In the "repeat" operation on machines of this character, it is understood that the number set up on the keyboard is retained, while the handle is operated several times to repeatedly add the same number, and for this purpose, the auxiliary bail 46 is adapted to be moved toward the rear and held in that position for the "repeat" operation. In my improved construction this is accomplished by a simple mechanism comprising a bell crank shaped repeat key lever 52, pivotally mounted on a screw 53 (see Fig. 3) on a forwardly and upwardly projecting arm 44b on the left end of the rock bail 44. The repeat key lever 52 is held in frictional contact with the bail arm 44b by means of a spring 54, extending between the head of the pivot screw 53 and the side of the lever, as indicated in Figs. 3 and 10 of the drawings. The rearwardly extending arm of the lever 52 is provided with a cam surface at 55, adapted to engage the auxiliary rock bail 46 and force it rearward against the action of its spring 49, and at the upper end of the cam surface a notch at 56 is provided, which will limit the movement of the repeat key toward the rear and, by engaging the edge of the bail 46, will retain the latter in position for the repeat operation. In the "repeat" position of the repeat key lever 52, as shown in Fig. 36, the pin 51 on the arm 50 of the auxiliary bail 46 will be held out of operative position and, therefore, the latch strip rock bail 44 will not be actuated by the handle mechanism to release any keys set in the keyboard.

In repeat operations it frequently happens that after the number set up in the keyboard has been repeatedly added the required number of times, the depressed keys remain in depressed position because the operator did not release the repeat key before the last repeat operation of the handle. Therefore, it is necessary to manually release the set keys, and this is adapted to be accomplished in a simple manner, in my improved machine, by mounting the repeat key lever 52, as previously explained, on the latch strip rock bail 44, and providing the arm 44b, on which the repeat lever 52 is pivoted, with a laterally extending ear 57, adapted to be engaged by the upwardly extending arm of the repeat key which, as indicated in Fig. 3 of the drawings, is provided with the finger button 58. Thus, by a continuing pull on the repeat key button 58, the lever 52 is moved to release the auxiliary bail 46 from the notch 56, thereby permitting the spring 49 to restore it to normal position, and the repeat lever, by engaging the ear 57 as the lever is drawn forward, will rock the latch strip bail 44 to release the set keys of the keyboard.

During the operating of the machine, adding unit stop slides, hereinafter referred to, are adapted to engage the lower extremities or tail stops of the set keys and the impact, particularly during the repeat operation, is apt to jar the depressed keys so that there is a possibility of jarring the latch strips loose and permitting release of the keys. In order to prevent accidental release under these circumstances, the latch strips 28 are preferably provided with notches 59, near their rear ends, with which a locking bail 60 is adapted to cooperate for preventing movement of the latch strips, after the handle has been started on its forward stroke. The locking bail 60 is pivotally mounted by arms 61, see Figs. 13 and 15, on the ends of the rearmost key spring supporting rod 34 mounted in the side plates 15 of the keyboard unit, as will be seen in Fig. 10 of the drawings. The locking bail 60 is preferably provided with a downwardly and rearwardly extending arm 62, adapted to cooperate with a pin 63, carried on a lever arm hereinafter referred to in describing the control mechanism operated by the handle. The arrangement, as will be seen in Figs. 13 and 15, is such that, in normal position of the handle, the pin 63, by engaging the lower end of the arm 62, lifts and holds the locking bail 60 out of engagement with the notches 59 in the latch strips 28, thereby permitting keys to be freely set. However, after the handle has started and is on its forward stroke, the pin 63 will be moved out of engagement with the arm 62, thus permitting the locking bail 60 to engage the notches of the latch strips and prevent accidental movement thereof.

The parts and mechanisms thus far described constitute the complete keyboard unit, which, as previously stated, is readily removable from the frame of the machine by withdrawing the rods 16. In this connection, attention is called to an important minor improvement. The key stem tails or stop fingers 20 and 21 are rather delicate and, in removing the keyboard unit from the machine, these tail stops are likely to be bent, if any of the keys happen to be in depressed position when the attempt is made to remove the keyboard. Therefore, a depending arm 64 on the right side of the key latch releasing bail 44 is provided with a laterally projecting stud 65 (see Figs. 1 and 10) which is adapted to cooperate with a notch at 66, in the frame plate 5 on the right side of the machine, so that upon lifting the front end of the keyboard unit, which is necessary when removing the same from the frame of the machine, the stud 65, by engaging the frame plate, will move the rock bail 44 toward the front of the machine, thereby moving the key latch strips 28 to release any keys that may have been depressed. The depending rock bail arm 64 is also provided with a laterally projecting stud 67, located slightly to the rear of the stud 65 and projecting further outward, as will be seen in Fig. 10 of the drawings. The stud 67 is adapted to cooperate with the total clearing lever as hereinafter described and as shown in Fig. 35.

*Adding units.*—The adding units are rotatably mounted upon the main shaft 68, to which the handle is secured, as hereinafter described, and comprise driver elements 69, carrying type segments 70 which extend toward the rear of the machine, as indicated in Figs. 2 and 14 of the drawings. The type segments are formed as narrow rolled type strips, concentrically mounted on arcuate flanges on the driver elements 69, the type being fixed thereon and adapted to be printed from by movement of the platen against the type segments, as hereinafter described. The type segments or driver elements 69 of the adding units are provided with upwardly projecting stop lugs 71, adapted to cooperate with ears 72 bent over on the ends of the stop levers 37, hereinbefore referred to in describing the keyboard unit, and adapted to be positioned by the latch strips 28 when keys in the keyboard are depressed. The arrangement is such that when the keys are set, the ears 72 are lifted sufficiently to clear the ends of the stop lugs 71, thereby permitting rotation of the adding units, when the handle is operated. The type segments and adding units are preferably mounted in condensed form, as shown in Fig. 7, that is, to correspond to the spacing of the printed members, and, since the rows of keys are spaced further apart than is required for the type segments, the rear ends of the stop levers 37 are bent inward, as indicated in Figs. 7, 12, and 13, to bring the ears 72 thereof into cooperative relation with the adding unit stop lugs 71. The disc-like driver element type segments 69—70 are secured to hubs 73, which are preferably formed with pulley grooves, as will be seen in Figs. 7 and 20, and driving springs 74 pass over the hubs and engage pins 75, secured to the respective driving elements 69. The opposite ends of the springs 74 are carried forward and anchored in holes 76 in a cross bar 77, extending between the side plates 5 and 6, and supported thereby, as indicated in Figs. 2, 9 and 16 of the drawings. By this arrangement, it will be seen that the driving elements 69, and hence, the adding units, are urged forward by the action of the springs 74, but are normally prevented from such forward movement by a bail hereinafter described. The units may be freed for such forward movement by the depression of the keys in the keyboard which would lift the levers 37.

The hubs 73 of the type segment driving elements 69 extend a short distance on the right side of the latter to form bearing shoulders 78, upon which adding sectors 79 are rotatably mounted. The adding sectors are preferably spaced slightly from the associated driver-type segment discs 69 by annular beads and are provided with elongated slotted holes 80, through which headed rivets 81 extend, thereby securing the adding sectors to the respective driving elements for independent rotation to the extent of one unit. The driving elements 69 and the adding sectors 79 are resiliently connected together by springs 82, substantially as indicated in Figs. 2, 18 and 21, the arrangement being such that the spring 82 is adapted to move the adding sectors for transfer of the tens, as more fully described hereinafter.

The movements of the adding units, after the stop levers 37 have been positioned by setting keys representing the number to be added, are adapted to be determined by the tail stops of the respective set keys. For this purpose, the adding sectors 79 are provided with pivot studs 83 to which links 84 are pivotally connected, as indicated in Fig. 2, the opposite ends of the links 84 being connected by bolts 85, with stop slides 86, which are provided with stop ears or lugs 87, adapted to engage the tail stops 20—21 of the keys 19. It has been previously pointed out that the adding units are mounted in condensed form, corresponding to the spacing required between the type segments and, therefore, the links 84 are bent or fan outwardly from their connection to adding sectors at their forward ends to their connections with the stop slides 86 which correspond with the spacing between rows of keys. The stop slides 86 are provided with elongated slots at 88 and 89 cooperating with annular grooves 90 in transversely extending rods 91, supported in the frame plates 5 and 6, as shown in Fig. 9; the arrangement being such that the stop slides 86 are held in proper spaced relation, and are freely slidable for differential positioning of the respective adding units according to numbers set up on the keyboard. A transverse rod 91$^a$ is supported in the frame plates 5 and 6 forwardly of the forward ends of the links 84. This rod 91$^a$ serves as an abutment for the links and prevents their being accidentally moved out far enough to disengage the slots 89 from the rod 91.

An important feature of my improvement in association with the link connections 84 and the stop slide strips 86, is to provide for independent resilient movement between these elements. This is accomplished by slidably mounting the pins or bolts 85 of the connecting links 84 in the forward ends of the slots 88 of the respective stop slides 86, so as to permit relative longitudinal movement therebetween. The pins or bolts 85 are held normally at the forward ends of the respective slots 88 by means of springs 92, connected to fingers 93 on the links 84, and to pins 94 in the forward ends of the respective stop slides 86, as will be seen more particularly in Figs. 2 and 9 of the drawings. This arrangement provides a safety device to prevent injury to the machine in case a key is accidentally depressed during the return stroke of the handle. Therefore, if this should occur, that is, a key is depressed before the full return of the stop slides, then one of the stop lugs 87 would engage the front side of a key tail stop 20—21, and thus prevent the return of the corresponding stop slide 86 with its associate adding sector 79, which, as hereinafter described, is adapted to be returned to normal position when the driving elements 69 are returned by the pick-up bail, but this would merely stretch the spring 92 and as soon as the return of the handle releases the key the spring will snap the stop slide back to normal position.

It has been previously pointed out that, in order to condense the keyboard and at the same time provide for a greater movement of the stop slides 86 than the distance between the keys in a row, the tail stops of the keys are arranged in three parallel lines. This arrangement is of advantage in that it requires less accuracy in adjusting the relation between the parts. Accordingly, the stop ears or lugs 87 on the stop slide strips 86 are correspondingly arranged in three lines, as indicated in Fig. 8 of the drawings, in order to bring the stops into proper cooperative relation with the three lines of tail stops 20 and 21 of the keys. The upper or rear stops on the stop slides 86, instead of being upwardly projecting lugs or ears as at 87, are preferably shoulders 95 and 96 on a folded-over angle projection on the stop slides, as will be seen in Figs. 2 and 9 of the drawings. This construction allows for a more compact arrangement between operating parts of the machine.

In order to guide and insure movement parallel to the stop slides 86 with which they are slidably connected, the forward ends of the links 84 are preferably provided with depending arms or lugs 97, engaging slots 98 in a comb plate 99, secured at the front of the machine to the base cross bar 3, by suitable screws 100. The depending lugs 97 are preferably adapted to cooperate with a universal bail 101, provided with rock arms 102 pivotally mounted upon a shaft 103 extending transversely of the machine near the bottom thereof and supported in the side frame plates 5 and 6, as shown in Figs. 2 and 8. A spring 102ª connected to the comb plate 99 and to the right hand rock arm 102 tends to hold the bail forward against the depending lugs 97. The right end of the universal bail 101 is provided with an upwardly projecting arm 104 (Fig. 1) provided with a laterally projecting ear 105, adapted to cooperate with a finger formed as part of the total clearing lever, as hereinafter more particularly described. The arrangement is such that, if any of the links 84, and the associated adding sectors, are out of normal position because of transfer of the tens, the universal bail 101 will be moved rearward, thereby placing the ear 105 in position to be engaged by the finger 106, to thereby prevent operation of the total key, as hereinafter described, until the adding sectors and links have been restored to normal position by an idle stroke of the handle. It will be seen that the stop slides 86 are mounted in the machine at an angle of about 30° to the horizontal, so as to slide in parallel relation to the underside of the keyboard unit, the stop lugs 87 being adapted to clear the tails or stop ends of the keys when the keys are in normal retracted position.

*Accumulator unit.*—The adding sectors 79, which are adapted to cooperate with the accumulators or register wheels, are provided with segmental gear racks 107 formed concentrically with the main shaft 68 and adapted to engage the register wheel pinions 108, rotatably mounted on a transverse rod or shaft 109, the ends of which are supported in the side bars 110 of the accumulator unit rock frame, as indicated in Figs. 2, 17 and 18 of the drawings. The accumulators or register wheels comprise hubs 111, (see Fig. 20) upon which the pinions 108 are mounted, the pinions being preferably flanked on each side by outwardly flaring cupped discs 112, which are adapted to maintain regisration between the thin sheet metal adding sector racks 107 and the respective register wheel pinions 108. On the left sides of the hubs 111, there are preferably mounted rings 113, carrying single teeth 114, forming the triggers for operating the carrying pawls in the transfer of the tens. The triggers 114 are preferably slanting on one face and straight on the other and adapted to cooperate with ratchet-tooth-like noses 115 at the forward ends of carrying levers 116, which in my improvement are pivotally mounted on a transverse shaft 117, supported in the accumulator unit side bars 110, as indicated in Fig. 7 of the drawings, and, therefore, are movable with the register wheels when the latter are moved out of and into engagement with the adding sector racks 107. The rear ends 118 of the carrying levers are preferably provided with laterally extending ears 119, adapted to cooperate with forwardly projecting detent fingers 120 formed on the lower extremities of the respective adding sectors to limit the return movement of the latter and control the transfer of the tens. The accumulator unit rock frame is preferably mounted on a transversely extending rock shaft 121, the ends of which are pivotally supported in the main side frame plates 5 and 6. The accumulator unit is adapted to be rocked with the pivot rod 121, as hereinafter described for moving the register wheel pinions into and out of mesh with the adding sector racks 107. Preferably, the rock shaft 121 is provided with a plurality of notches 122, extending transversely of the axis of the shaft, into which the respective detent fingers 120 of the adding sectors are adapted to project for cooperation with the ears 119 on the carrying levers. By this construction, it will be seen that the engagement between the carrying lever ears 119 and the detent fingers 120 is brought close to the axis of rotation of the accumulator unit, so that the slight rocking motion thereof, in moving the register wheels into and out of cooperative relation with the adding sectors, will not materially affect the relation between the carrying levers and the adding sectors.

The noses 115 of the carrying levers 116 are provided with cam bevel faces 123 for cooperation with the triggers 114, as the register wheels 108 are rotated during normal addition. Opposite the cam faces, the tooth-like noses 115 of the carrying levers are straight, that is, substantially radial as to the register wheels, to form detent latches for engaging correspondingly radial faces on the triggers 114 when the register wheels are rotated in the opposite direction to reset the accumulators to zero or take the total. It will be understood that when the register wheel pinions 108 are rotated more than 9 units, during addition, the triggers 114 will engage the bevel faces 123 on the ends of the carrying levers 116 and move the latter, so that the opposite ends 118 thereof will be moved out of the field of the detent fingers 120, thereby permitting the respective adding sectors to move forward an additional unit space, under the pull of the transfer springs 82, for the transfer of the tens. It will be apparent, however, that frequently the adding sectors, and hence the detent fingers, will not have returned to normal positions, as indicated in Fig. 18, at the time the carrying levers 116 are tripped by the triggers 114, and, therefore, means must be provided for holding the carrying levers 116 in tripped position, until the transfer of the tens takes place. For this purpose, the carrying levers 116 are provided with depending arms 124, provided with laterally projecting ears 125, adapted to cooperate with latch lugs or notches 126 on latch pawls 127, pivotally mounted on a transverse shaft 128 supported in the side bars 110 of the accumulator rock frame, substantially as shown in Figs. 2, 7, 16 and 21 of the drawings. Springs are required for restoring and resiliently holding the carrying levers 116 in position to be engaged by the triggers 114, and, preferably for this purpose, double acting springs 129 are provided, which extend from holes 130 in the carrying levers 116 to pins 131 on the latch pawls 127, thereby also utilizing the springs for holding the latch pawls in engagement with the ears 125 when the carrying levers are displaced by the triggers.

After the transfer of the tens, at the end of a return stroke of the handle, it is necessary to reset the carrying levers 116 for the transfer of the tens on the next return stroke of the handle, and this is done during the forward stroke of the handle. When the accumulator rock frame 110 is moved downward to disengage the register wheel pinions 108 from the adding sector racks 107, the outer ends 132 of the latch pawls 127 are adapted to engage a transversely disposed fixed rod 133, which will lift the latches from the position shown in Fig. 17, to the position shown in Fig. 14, and thereby release the transfer levers 116 and permit them to return to normal position by the pull of the springs 129, as indicated in Fig. 21, provided the detent fingers 120 have been pushed back, as hereinafter described. When the register wheel pinions 108 are again moved into mesh with the adding sectors, there will be no possibility of displacement of pinions by the carrying levers, for both move together with the rock frame 110.

During the positioning movements of the adding sectors, the register wheel pinions 108 are moved out of mesh with the adding sector racks 107 and, therefore, the register wheels, being freely rotatable, are liable to become displaced. To obviate this, fixed detents 134 are preferably located below the register wheels, as indicated in Figs. 2 and 21 of the drawings, for engaging the respective register wheel pinions 108 when the latter are moved out of mesh with the adding sectors, as indicated in Fig. 14. The detents 134 are preferably punched out of thin sheet metal and provided with tooth-like noses adapted to project upward between the guide discs 112 (see Fig. 20), so as to properly align with and enter between the teeth of the register wheel pinions 108. The bases of the detents 134 are preferably provided with semi-circular notches 135, which are adapted to engage annular grooves 136 in horizontally disposed rods 137, supported by and between the main frame plates 5 and 6, thereby providing means for securing and properly spacing the respective detents 134. In order to limit the vibrating or rocking movement of the accumulator rock frame 110, when the register wheel pinions 108 are moved into and out of mesh with the racks 107 of the adding sectors, the rock frame side bars 110 are provided with forked ends, the lower forwardly projecting fingers 138 being adapted to cooperate with a fixed transverse rod 139, supported in the main frame plates 5 and 6, substantially as indicated in Figs. 2 and 21, to limit the movement of the pinions toward the adding sector racks, while the upper forwardly extending ends 138ª of the side bars 110, by engaging the rod 139, will limit the movement of the accumulator rock frame when the register wheel pinions are withdrawn from the adding sectors, as indicated in Fig. 14 of the drawings. The side bars 110 of the accumulator rock frame are preferably secured rigidly together by transverse stay rods 140, the ends of which are riveted to the respective side bars 110, but the transverse rods 109, 117 and 128, supporting respectively the register wheels, the carrying levers and the latch pawls, are removably secured in the rock frame by sealing clips such as the sealing clips 17, previously referred to.

*Printing mechanism.*—It has been previously pointed out that the type 70 on the respective driving element type segments 69 are faced radially outward toward the rear and are adapted to be printed on by a suitable platen, which is moved toward and from the type segments. For this purpose, the platen 141, Figs. 2, 24 and 25, is rotatably mounted in platen frame side plates 142, which are secured together by transversely extending stay rods 143, 144 and 145, to form a rock frame, which is mounted upon a transversely extending rock shaft 146. The platen frame side plates 142 may be secured to or otherwise adapted to be rocked by rocking the shaft 146, but preferably, a suitable hub 147 is mounted on the rock shaft 146, as indicated in Figs. 2 and 6 of the drawings, and secured thereto by a suitable set pin 148, the hub being provided with a rock arm 149, forked at its lower end and adapted to engage the lowermost platen rock frame stay rods 145, as shown in Fig. 2. A collar 150 is preferably secured to the rock shaft 146 adjacent the left side plate 142 to hold the platen rock frame in spaced relation to the main frame side plates 5 and 6, a spacing collar 150ª being inserted between the rock frame and the side plate 6, as indicated in Fig. 6. An additional collar 151 is secured to the left end of the rock shaft 146, outside the side plate 6, for preventing movement of the shaft toward the right, as viewed from the front of the machine. The side plates 142 of the platen rock frame are preferably provided with forwardly projecting lugs 152, adapted to engage a fixed transverse rod 153, mounted in the main frame plates 5 and 6, for limiting the rearward movement of the platen under the action of a spring 154, (see Fig. 6) preferably connected at one end to the lowermost stay rod 145, the other end extending toward the front of the machine and being suitably anchored to one of the fixed transverse rods, previously referred to. The lower extremities of the platen frame side plates 142 are formed as stop fingers 155, adapted to cooperate with a transversely extending stop rod 156, for limiting the movement of the platen toward the type segments under the action of the handle as hereinafter described. The stop rod 156 is preferably adapted to be adjusted up and down by being mounted in vertical slots 157, as shown in Figs. 1 and 2, the stop rod being held in adjusted position by suitable nuts or screws 158. By means of this adjustment, the pressure of the platen against the type 70 of the type segments may be regulated.

The platen 141 is preferably secured to a platen shaft 159 by suitable set screws in the hub 160 of the platen, and the right end of the platen shaft 159 is provided with the usual knurled knob or twirler 162 for manual operation of the platen. The hub 161 at the right end of the platen is preferably provided with a line space ratchet wheel 163, which is adapted to cooperate with the nose 164 of a line space pawl 165 pivoted at 166 to a stud 167 secured to the main frame plate 5, as shown in Fig. 6 of the drawings. A spring 168 is provided for urging the line space pawl toward the rear, the spring being connected to the pawl and to a fixed pin at 169. Movement of the line space pawl 165 toward the rear is limited by a forwardly projecting finger 170, which is adapted to engage the stop rod 153, as indicated in Fig. 24. A detent roller 163ª is mounted on the end of a lever 163b and adapted to resiliently engage the teeth of the line space ratchet 163, a spring 163c being connected between the lever and a pin in the platen frame plate 142.

The arrangement just described is such that, when the platen rock frame is moved forward, the end 164 of the line space pawl 165 will be brought into contact with the ratchet wheel 163 and moved down to the position shown in Fig. 25, so that upon the return stroke of the handle, as the platen rock frame moves back to normal position, the platen will be rotated one line space, but just before the platen rock frame reaches normal position, the pawl 165 will be withdrawn from the ratchet wheel by the engagement of the finger 170 with the rod 153, and the platen will be held by the detent roller 163ª. The normal position of the parts is illustrated in Fig. 24.

Paper feed and guide mechanisms are provided for the platen 141 and these may be of any desired construction. In the present instance, a deflector plate or apron and paper guide 171 is secured by screws 172 to the stay rod 144, immediately below the platen, (see Figs. 2 and 6) and extends in a semi-circular loop 173 around the front of the platen. The guide plate is preferably cut out at 174, some distance below the printing line, to leave space for the type segments to reach the platen, or the paper thereon, for the printing operation. The ends 175 of the narrow strips of the paper guide, on each side of the printing line, are preferably bent upward and pass through holes 176 in a paper-tearing-off blade 177, which is secured to the uppermost stay rod 143 by ears 178 substantially as shown in Figs. 2 and 24. The tearing-off blade 177 is held in proper position by lugs 179, at the ends thereof, entering suitable holes in the platen frame plates 142, as shown in Fig. 24. The deflector plate 171, toward the front of the platen, is provided with elongated openings at 180, through which metal feed rollers 181 are adapted to contact with the surface of the platen or with the paper thereon. The feed rollers 181 are preferably provided with knurled faces, and are freely rotatable upon a transversely extending shaft 182, the ends of which are loosely supported in forwardly projecting arms 183 of a feed roller rock frame 184, pivotally mounted on the stay rod 144 substantially as shown in Fig. 2. A spring 185 is coiled about the stay rod 144 and arranged so that one end engages a notch 186 in the feed roller shaft 182, as will be seen in Fig. 24, while the other end engages the depending edge of the guide plate 171, as will be seen in Figs. 2 and 6 of the drawings. In this manner, the feed rollers 181 are resiliently held for feeding engagement with the platen and, preferably, the feed roller rock frame 184 is provided with rearwardly and upwardly extending finger pieces 187, which may be moved inward for releasing the feed rollers from the platen when it is desired to adjust the paper.

The platen 141 is preferably narrow, so as to accommodate merely a narrow strip or ribbon of paper, adapted to be drawn from a roll 188, (see Fig. 25). The roll is removably mounted upon shaft 189 provided with annular grooves 190 at the ends thereof, which are adapted to engage slots 191 in a paper roll bracket 192. The paper roll bracket is preferably secured to the rear lower edge of the cover casing 8 by suitable screws 193, as shown in Figs. 2 and 25. The slots 191 in the paper roll bracket 192 preferably extend upward and rearward at a relatively sharp angle, so as to facilitate gravity feed to keep the roll of paper in contact with the friction roller 194, rotatably mounted in forwardly projecting extensions 195 of the roll holder bracket 192, as indicated in Figs. 25 and 26 of the drawings. This arrangement enables the paper to be readily drawn from the roll 188, upward and over the deflector plate 171, the tension on the paper strip being regulated by the pressure of the roll of paper against the friction roller 194.

The roller 194 is preferably placed close to the rock shaft 146 on which the platen rock frame is mounted. The paper always runs from the roller 194 to the platen so that the relation of the paper to the platen remains the same without regard to the diameter of the roll of paper.

The paper, therefore, will be fed under uniform conditions at all times; and by placing the roller 194 close to the pivotal axis of the rock frame no material slack will be developed in the paper strip between the platen and the roller because of the oscillations of the rock frame. Any slight slack developed will be taken up by the feeding of the paper around the platen.

*Control mechanism.*—The handle 196, which is adapted to operate the machine after keys have been set in the keyboard or for taking the total, is preferably provided with a boss-like hub 197, removably attached to the end of the main shaft 68 by means of a screw 198 passing through a hole in the hub boss 197, the screw being threaded into the end of the shaft 68, substantially as indicated in Fig. 7. The right end of the main shaft 68 is provided with a collar 199, secured thereto by a pin 200, the outer end of the collar being cut away to form a tongue (see Figs. 1 and 7) adapted to cooperate with a transverse slot on the handle hub boss 197, to insure the rotation of the shaft 68 when the handle 196 is operated. The collar 199 is preferably adapted to form the hub of a cam disc 201, secured thereto and adapted to be rotated by the handle. The cam disc 201 is provided with an arcuate slot at 202, (see Fig. 1) adapted to cooperate with a laterally projecting stud 203, secured in the side frame plate 5, the stud and slot being adapted to limit the forward and return throw of the handle. Preferably, the return stroke of the handle is cushioned by securing a leather pad 204 to the back side of the cam disc 201, in position to engage the stud 203, substantially as indicated in Fig. 1 of the drawings. The peripheral edge of the cam disc 201 is provided with a cam at 205, adapted to cooperate with a friction roller 206, mounted on the upper end of a lever 207 pivoted at 208, to a rock arm 209, secured to the end of the rock shaft 121, upon which the accumulator rock frame 110 is mounted, as previously described. The forward end 210 of the rock arm 209 is provided with a laterally projecting stud or pin 211, projecting through a slotted opening 212 in the side frame plate 5. The inner end of the stud 211 passes through a hole in the end of the right side bar 110 of the accumulator rock frame and is secured thereto by a nut 213a, substantially as shown in Fig. 7, thereby tying the accumulator rock frame to the rock arm 209, so that any movement of the latter will be transmitted to the rock frame. A spring 214, secured to the stud 211 and to the relatively fixed transverse rod 91, as indicated in Figs. 7 and 9, is adapted to normally hold the register wheel pinions 108 in mesh with the adding sector racks 107. By the construction just described, it will be seen that when the handle is drawn forward, the cam 205 will engage the friction roller 206 and move the rock arm 209 downward, and when the roller passes onto the dwell portion 215 of the cam disc, the latter will maintain the register wheels out of mesh until the end of the forward stroke of the handle. The friction roller lever 207 is provided with a rearwardly projecting stop lug 216 engaging a pin 217, mounted on the rock arm 209, and a spring 218a extending from the pin 217 to a pin 218, secured to the lever 207, is adapted to hold the friction roller lever in the position shown in Fig. 1, with the lug 216 in contact with the pin 217. It will be seen, however, that the line of thrust between the friction roller 206 and the pivot 208 of the lever is such that as soon as the cam disc 201—215 starts on its return movement, the friction roller 206 will be pushed to the left (as seen in Fig. 1) beyond the line of thrust and, under the action of the spring 214, the accumulator rock frame will be snapped back into normal position, and the register wheels 108 will again mesh with the adding sector racks. Ordinarily, the frictional engagement between the roller 206 and the dwell edge 215 of the cam disc is sufficient to insure tripping of the lever 207 and moving the roller beyond the line of thrust, but in order to insure this action, the dwell edge 215 is preferably provided with a notch 219, which will offer sufficient resistance to the friction roller to carry it beyond the line of center and permit the restoration of the register wheels as previously described.

The cam disc 201 is cut away at its rear portion and provided with a rearwardly projecting arm 220, carrying a friction roller 221 adapated to engage the laterally projecting pin 51 on the trip lever 50 of the rock bail 46, previously described as being adapted to rock the bail 44 and release the keys by forward movement of the latch strips 28. It will be noted that on the forward stroke of the handle, the friction roller 221 will engage the pin 51 and trip the arm 50 without actuating the rock bail 44 to release the keys, but on the return stroke of the handle, the pin 51 will be engaged by the roller 221 and the two bails 46 and 44 will be locked together, and the latter will be moved to release the keys. The roller 221 continuing on the return stroke will pass under the pin 51 to the position shown in Fig. 1 of the drawings, thereby permitting the restoration of the latch bail 44, under the action of the latch strip springs 43, as previously described.

The cam disc 201 is also utilized for operating the platen rock frame for moving it toward and from the type segments in the printing operation. For this purpose, a link or pitman 222 is pivotally mounted on a stud 223 carried by the cam disc 201, forward of its axis of rotation on the main or handle shaft 68, as indicated in Fig. 1, the link extending downward and rearward at an angle, such that a toggle action will be secured between the pivot 223 and the link when the handle is at the forward end of its stroke, as shown in Fig. 28 of the drawings. The rear end of the pitman or link 222 is provided with a laterally and inwardly projecting stud 224, preferably mounted for slight adjustment and secured in place by a lock nut 225. The inwardly projecting stud 224 is adapted to normally ride in an elongated notch or open slot 226 in the lower extremity of a crank arm 227, secured to the outer end of the platen frame rock shaft 146, the arrangement being such that there is a certain amount of lost motion during the first part of the forward stroke of the handle, before the stud 224 will engage the rear end of the open slot 226 and rock the platen toward the printing point. The toggle action near the end of the forward stroke, as the pivot brings the pitman to dead center, will force the platen against the type segments for pressure printing the numbers thereon that are brought to the printing line. The amount of pressure required for printing varies with the number of segments to be printed from, and the adjustment of the stud 224 is adapted to be made according to the pressure required. It has been previously pointed out, however, that, in order to limit the movement of the platen against the type segments, the lower extremities 155 of the platen rock frame are adapted to engage the transversely extending stop rod 156 (see Fig. 2) to thereby prevent excessive pressure when only a few type segments are to be printed from. The link or pitman 222 is preferably held in proper relation with the open slot 226 in the crank arm 227, by a vertically slotted bracket plate 228 secured to the side of the crank arm 227, substantially as indicated in Figs. 1 and 7 of the drawings, the slot being elongated to allow upward movement of the end of the link.

It is frequently desirable in machines of this type to operate the machine without printing the numbers, and this is usually effected by providing a special mechanism operated or controlled by a non-print key. In the present instance it will be seen that, if the stud 224 on the end of the pitman or link 222 is lifted out of the open slot 226, the rock arm 227 will not be operated on the forward stroke of the handle and, hence, the platen will not be moved forward for printing. Therefore, the stud 224, at its inner end, is provided with a pin 229 (Fig. 7)

projecting through an opening in the side plate 5 to engage the upper edge of the rear end of a lever 230, pivoted at 231, substantially as shown in Fig. 29. The lever 230 is located just inside the right frame plate 5 of the machine and the forward end 232 thereof is offset so as to lie outside of the frame plate, which is provided with an opening 233 at this point, as indicated in Fig. 1. The forward end 232 of the lever is provided with an outwardly projecting stud or pin 234, passing through an elongated slot or opening 235 in the lower end of a non-print key 236, which extends upward through a slit in a laterally projecting shelf-like plate or bracket 237, secured to the side frame plate 5, substantially parallel to the keyboard as will be seen in Fig. 1. Preferably the pin 234 is floatingly mounted in the slot 235, by means of two springs 238 and 239, each connected to the pin 234, the lower spring 238 being connected at 240 to the lower end of the key, while the upper spring 239 is connected at 241, whith the shelf 237, as indicated in Fig. 29. This connection is desirable because of the resistance at the rear end of the lever 230 when attempting to lift the stud 224 before operating the handle. The rear end of the lever 230 is provided with an arcuate edge at 242 to permit the stud 224 on the end of the link 222 to slide over the notch 226 during the handle operation, when the forward end 232 of the lever is pulled down by the spring 238, after depressing the key 236. The key 236 is preferably provided with a notch 243, adapted to engage the shelf plate 237 when the key is depressed to hold the key in depressed position.

This arrangement enables the key 236 to be depressed and latched down before the handle is started, the lower spring 238 being extended thereby, and as soon as the handle is started, the lever 230—232 will be drawn down to the position shown in Fig. 29, thereby lifting the stud 224, so that it will ride over the end of the open slot 226 without moving the platen rock arm 227.

For taking the total and clearing the machine, special mechanisms are provided, which, in the present improvement, are much simpler than in prior machines. During normal operation of the machine for addition, the friction roller 206 is adapted to stand in the position shown in Fig. 1, so as to be engaged by the cam 205 to move the register wheels out of engagement with the adding sectors on the forward stroke of the handle; and when the friction roller lever 207 is tripped on the return stroke of the handle, the register wheels will be again brought into mesh with the adding sectors to accumulate the number to be added on the return stroke. It will be seen that normally the register wheels are in mesh with the adding sectors, as shown in Fig. 2, and, therefore, in taking the total, all that is necessary is to retain them in this position on the forward stroke of the handle, thereby positioning the respective adding sectors according to the digits representing the total on the register wheels. For this purpose a combined total and clearing lever 244 is pivotally mounted on a stud 245 projecting from the right frame plate 5. Preferably a double acting spring 246, extending radially of the pivot stud 245, is connected between a pin 247 on the lever 244 and a fixed pin 248 on the frame plate 5. The spring 246 will hold the total clearing lever 244 in and restore it to the position represented in Fig. 1, which is the normal idle or inoperative position, the lever being adapted for movement counter-clockwise and clockwise, as hereinafter explained. A total key lever 249 is preferably pivoted on a stud 250 to the side frame plate 5, and is provided with an open slot at 251 engaging a pin 252 projecting from the side of the total clearing lever 244, as indicated in Fig. 1. A finger button 253 is provided for moving the upper end of the total key lever 249 toward the rear, thereby operating the total clearing lever 244 counter-clockwise. The lower extremity of the total clearing lever 244 is preferably provided with an arm 254 adapted to cooperate with a pin 255, extending inward from the lower end of the friction roller lever 207, previously described as mounted on the rock arm 209 of the accumulator rock frame. The total clearing lever arm 254 is adapted to engage the pin 255 when the total key 253 is moved rearward, (see Fig. 32) thereby moving the friction roller 206 out of the field of the cam 205. Thus, when the handle is operated, as shown in Fig. 34, after the total key 253 has been operated, the register wheels will remain in mesh with the adding sectors on the forward stroke of the handle, thereby permitting the triggers 114 (Fig. 33) to engage the flat sides of the noses 115 of the carrying levers and locate the type segments according to the total represented on the accumulators. It has been previously pointed out that during the return stroke of the handle, in normal addition, the register wheels are in mesh with the adding sectors, and this will be true after the forward stroke in the total operation thus far described; therefore, the total will remain on the register wheels at the end of the return stroke of the handle, thereby giving what is called a sub-total.

In order to clear the register wheels, after a total has been obtained, it is necessary to provide means for moving the register wheels out of mesh with the adding sectors on the return stroke of the handle. For this purpose the total clearing lever 244 is adapted to be rocked in the opposite direction, that is, clockwise, on the return stroke of the handle. In order to accomplish this, a trip lever 256 is pivotally mounted on a stud 257 projecting outward from the side of the frame plate 5, the lever being held normally in the position shown in Fig. 1, by means of a radial double acting spring 258 connected to the tail of the lever and to the lower end 259 of a clearing key 260. The stud 257 is adapted to be engaged by a depending stop-projection 244ª upon the lever 244 to limit the counter-clockwise movement of said lever. The upper end of the clearing key 260 is slidably mounted in the shelf-like plate 237, previously referred to as supporting the non-add key 236, while the lower end thereof is preferably pivoted, at 261, to the front end of a lever 262, pivotally mounted on the main handle shaft 68, as shown in Fig. 7 of the drawings, a bridge bracket 263 being secured thereto to provide for a wide bearing on the shaft 68. The rear end of the lever 262 is bent inward at right angles, as shown at 264, in Fig. 7, and the end of this portion is bent rearward, parallel to the type segments and lies adjacent the units segment. This final rear end of the lever is pointed at 265 (see Fig. 1) to form a dash (—), which is adapted to be printed on the paper at the side of the total when the clearing key 260 is depressed. The clearing key is provided with a notch at 266, adapted to engage the edge of the plate 237, to thereby hold the key in depressed position. A spring 267, extending from the pin 261 to the shelf plate 237, is adapted to restore the key 260 to normal position and move the character end 265 thereof out of printing position.

A stud 268 projecting from the side of the cam disc 201 is adapted to pass the rear end of the trip lever 256 when the latter is in the position shown in Fig. 1, but when the clearing key 260 is depressed as indicated in Fig. 35, the stud 268 will engage the tapering end 269 of the trip lever, on the forward stroke of the handle, and merely push it out of the way. The spring 258, however, will flip the point 269 of the trip lever back into the path of the stud 268, as soon as the latter has passed, so that upon the return stroke of the handle, as shown in Fig. 38, the stud 268 will engage the other side of the lever 256 and swing it up into engagement with a pin or stud 270, projecting from the total clearing lever 244, and, as the handle continues on the return stroke, the total clearing lever 244 will be moved clockwise, as viewed in Fig. 38. The lower extremity of the total lever 244 is provided with a cam surface at 271, adapted to engage the stud 211 and move the accumulator rock frame downward to disengage the register wheels from the adding sectors, so that, during the return stroke of the handle, the register wheels will not be rotated. It will thus be seen that by combining the operation of the total key 253 and the clearing key 260, the register wheels will remain in mesh with the adding sectors during the forward stroke of the handle, so as to turn all of the register wheels back to zero and print the total, but, upon the return stroke of the handle, the trip lever 256 will come into action and, by withdrawing the register wheels from the adding sectors, the clearing operation is effected, thus leaving the register wheels in zero position. One particularly novel feature in connection with this mechanism is that, if the clearing key 260 is depressed during a normal operation, the trip lever 256 will come into action, as previously described, and the accumulator rock frame will be moved downward to disengage the register wheels from the adding sectors on the return stroke of the handle, so that the number set up in the keyboard will be printed but not added or accumulated on the register wheels. Thus in the clearing key, and without any additional mechanism, I have provided a "non-add" key, which may be used as such when required.

In prior machines of this type, various more or less complicated mechanisms or interlocking devices are required to prevent mal-operation, but in my improvement, few, if any, of such devices are required. For instance, it will be understood that no keys should be depressed in the keyboard when the total is to be taken; therefore, the upper extremity of the total clearing lever 244 is provided with a cam edge at 272 adapted to engage the stud 67, previously described as projecting from the rock bail 44, so that the latter will be moved toward the front of the machine to release any keys that may be depressed, while performing the necessary operation of lifting the stop levers 37 from in front of the detents 71 so that the adding units are free to move forward. The cam edge 272 is brought into operation when the total key 253 is moved rearward to take a total, as indicated in Fig. 35 of the drawings. Thus no special interlocking mechanism is required to prevent mal-operation of the keys.

The total clearing lever 244 is preferably provided with two studs or pins 273 and 274, spaced apart as indicated by dotted lines, in Fig. 1, so that, when the handle is operated, an arcuate locking plate 275, secured to the inside face of the cam plate 201, will pass between the pins and prevent operation of the total clearing lever 244. By this mechanism mal-operation of the total key is avoided. The pins 273 and 274 are of such diameter that, when the total key 253 is depressed, as shown in Fig. 35, the pin 273 will ride on the inner face of the locking plate 275 and prevent restoration of the total key until the end of the forward stroke of the handle, when its function is completed. If, as previously pointed out, the clearing key has also been depressed, as shown in Fig. 35, then the total clearing lever 244 will be rocked clockwise, on the return stroke of the handle, by the stud 268, and the locking pin 274 will ride on the outer face of the locking plate 275, as indicated in Fig. 38, thereby holding the total clearing lever 244, after positioning by trip lever 256, so as to prevent reengagement of the register wheels with the adding sectors until the end of the return stroke of the handle. It will be noted that the locking plate 275 enters behind the pin 274 just before the stud 268 passes off the tip 269 of the trip lever 256.

The total clearing lever 244 is provided with a forwardly projecting arm 276, from which a pin 277 extends outward, as indicated in Figs. 35 and 38, the pin being adapted to engage the stem of the clearing key 260 when the total clearing lever 244 is rocked clockwise, as will be the case when the key 260 is depressed, to thereby release the notch 266, and permit the key to be restored to normal position by its spring 267, as indicated in Fig. 38.

The total clearing lever 244 is also provided with a depending finger 278 (106) which, as shown in Fig. 35, is adapted, when the total key 253 is operated, to pass over, that is, clear the ear 105 on the upper end of the arm 104, previously referred to as carried by the universal bail 101, which lies in front of the forward ends 97 of the adding sector links 84, as will be seen in Figs. 1 and 2. If, however, any of the adding sectors have been permitted to move the extra unit space for transfer of the tens, that is, clockwise as viewed in Fig. 1 of the drawings, the bail 101 will be moved rearward to bring the ear 105 into the path of the finger 278, thereby preventing operation of the total key 253 until an idle stroke of the handle has restored the links 84 to normal position. By this means, an erroneous total is prevented.

When the ear 105 is in the path of the finger 278—106 the total clearing lever 244 will have a limited movement in response to the operation of the clearing key 249. This movement of the total clearing key will be sufficient to bring the locking pin 273 into the path of the locking flange 275 of the cam disc 201 thereby preventing the forward stroke of the handle and locking the entire handle-operated mechanism.

The control mechanisms thus far described are located or operated from the right side of the machine and the mechanism located on the left side of the machine will now be described. As will be seen in Fig. 4, the left end of the main handle shaft 68 is provided with a segmental cam plate 279, provided with a hub 280, secured to the shaft 68 by a pin 281. The cam plate 279 is provided with a cam slot 282 of irregular shape, extending from the outer periphery, where it is provided with a dwell at 283, inward toward the axis of the shaft 68, where it is provided with a dwell at 284. The cam slot 282 is adapted to cooperate with a roller 285, mounted on the end of a crank arm 286 extending from a stud shaft 287. The latter is rotatably mounted in a bearing boss 288 (see Fig. 7) secured to and projecting from the inner wall of the main frame plate 6. The crank arm 286 is preferably provided with an inwardly projecting stud 289, indicated by dotted lines just below the roller in Fig. 4, which projects through an arcuate slot 290 in the frame side plate 6. A pair of connecting links 291 are pivotally connected with the end of the stud 289, as indicated in Figs. 7 and 43, the links extending rearward and having their other ends pivotally connected to a stud 292 carried by and projecting from an arm 293, forming part of a universal rock bail 294 or adding unit pick-up bail. The pick-up bail 294, as will be seen in Figs. 2, 7, and 16, is rotatably mounted on the main shaft 68, and is normally located in front of the main shaft in position to cooperate with noses or stop edges 295, carried by and formed as part of the type segment discs 69, which, as previously pointed out, form the drive elements of the adding units. When the handle is operated, the cam roller 285 will be moved upward toward the center of the shaft 68 by following the cam slot 282, as indicated in Figs. 40 to 42, thereby moving the universal pick-up bail 294 counter-clockwise, as viewed in Fig. 2. This will permit the adding sectors to move forward, differentially, according to the number set up on the keyboard, and when the handle returns the bail 294 will pick up the respective adding units by engaging the noses 295 and restore the driving elements to normal position against the action of their springs 74.

It will be understood that the throw of the universal pick-up bail 294 should be accurately determined, for, on the forward stroke of the handle, the bail should move far enough to permit the adding unit driving elements 69 to move the full nine units or spaces and also, upon its return movement, to bring the driving elements back far enough for the key actuated stop levers 37 to drop in behind the stop noses 71. In order to insure accurate adjustment of the positions of the pick-up bail 294, both in its normal (return throw) position and at the end of its forward throw, the two links 291 are preferably employed, which, in the present instance, are made L-shaped, as indicated in Fig. 43, so that the short arms thereof may be bent forward or backward, to vary the distance between the centers 289 and 292. To facilitate the adjustment, the holes in one end of the links 291 are elongated, substantially as indicated at 296. It will thus be seen that one link 291 may be bent to locate the position of the universal bail 294 in its normal position, and the other bent so as to limit or locate it at the end of its forward throw. This is an important feature of my improvement, for it eliminates and does not require accurate manufacturing operations. An accurate limit for the forward throw of the pick-up bail 294 is desirable, for the bail, which moves in arcuate slots 79ᵃ back of the racks 107, is adapted to engage the adding sectors 79, at the bottom of these slots, (Fig. 14) and restore them to normal position, if any of them have moved forward, as indicated in Fig. 17, for transfer of the tens. This accurate positioning of the adding sectors 79 is required in order to move the fingers 120, at the lower extremities thereof, back far enough to permit the ears 119 on the carrying levers 116 to drop down in front of the fingers when the carrying levers are released and restored to normal position, as indicated in Fig. 14.

In order to insure the full forward throw of the pick-up bail 294, to move the adding sectors 79 the full predetermined limit, as just described, it has been found desirable to provide a positive driving member for moving the bail at the end of the forward stroke. This driving member preferably comprises a thin sheet metal spiral finger 297, carried by a hub 298 which is secured, by means of a pin 299 (see Fig. 7), to the main handle shaft 68, the end of the finger 297 being adapted, at the end of the forward stroke of the handle, to engage the stud 292, substantially as shown in Fig. 43, and positively move the pick-up rock bail 294 the full limit required. The spiral arrangement of the finger 297 provides for a resilient engagement between the finger and the stud 292 so as to avoid injury to the parts, particularly as a positive stop is provided for limiting the forward throw of the pick-up bail 294. This positive stop for limiting the forward throw of the pick-up bail 294 comprises a finger 300, extending radially (see Fig. 43) of an arm 301, rotatable with the pick-up bail upon the main handle shaft 68 and having its opposite end mounted upon the stud 292 previously referred to as extending laterally from the arm 293 of the pick-up bail 294. In this manner, the stop arm 300 is movable with the pick-up bail and is adapted to limit its movement on the forward stroke of the handle by engaging a fixed stay rod, preferably, the rearmost of the rods 91, which, as previously pointed out, support the stop slides 86 of the adding sectors, (see Fig. 2). The arm 301 is preferably bifurcated and provided with a second radially projecting finger 302 which carries the laterally projecting stud or pin 63, (see Fig. 15) previously described as adapted to engage the depending arm 62 of the locking bail 60, for holding the latter out of engagement with the notches 59 in the key latch strips 28. It will thus be seen that when the handle is operated on the forward stroke, the pin 63 will move out of the field of the rock arm 62, thus permitting the locking bail 60 to drop into the notches 59, as indicated in Fig. 14, and the stop finger 300 will engage the transverse rod 91 to limit the forward throw of the pick-up bail 294, the pick-up bail being positively moved to its ultimate forward throw by means of the resilient finger 297 as shown in Fig. 43.

The cam disc 279, which, as previously pointed out, is provided with the slotted cam 282, is provided, on about one fourth of its circumference, with double faced ratchet teeth at 303 adapted to cooperate with a double acting pawl 304, pivoted to the side plate 6 on a stud 305, and resiliently held for movement in either direction from a central position by means of a radial spring 306, extending from the tail of the pawl to a fixed pin 307. This simple mechanism provides the usual full stroke device, which compels the operator to make the full forward stroke of the handle, after the latter has been started and carried forward far enough for the pawl 304 to engage the ratchet teeth 303. On the return stroke, the pawl 304 will be reversed in its position of thrust, and will engage the teeth 303 to prevent forward operation of the handle until the full return stroke is completed.

For returning the handle, the cam plate 279 is preferably provided with a laterally projecting stud 308 (see Figs. 3 and 4) to the outer end of which a cord or cable 309 is secured by means of an anchor tip 310, pivotally held on the stud and secured to the end of the cable, substantially as indicated in Fig. 4. The cable extends toward the rear of the machine and passes over a pulley 311, rotatably mounted on a stud 312 projecting laterally from the main side frame plate 6. The other end of the cable 309 is provided with an anchor tip 313, which is secured to one end of an extension spring 314, the other end of the latter being secured to a pin or stud 315, projecting laterally from the side frame plate 6, near the front end thereof. By this means, it will be seen that I am enabled to use a long helical spring, which will give a substantially uniform pull on the handle mechanism to return the handle and associated parts to normal position after the forward stroke thereof. It is obvious, however, that in my improved construction, where the stroke of the handle is approximately 135°, the pull of the cord or cable 309, at the end of the forward stroke of the handle, as shown in Fig. 42, would be so nearly on the line of dead center that it might be ineffective in properly returning the parts to normal position. Therefore, to equalize the pull, a notched stud 316 is preferably mounted on the cam disc 279, at approximately 135° from the pin 308, in order to pick up the cord or cable 309 and thereby change the leverage so that the pull of the spring, at the beginning of the return stroke of the handle, will be more effective and at a suitable radius from the center of the main shaft 68.

In machines of this type, it is desirable to provide a governor for regulating the speed of operation of the control mechanism, particularly on the return stroke, when the operation is effected by the main handle spring. For this purpose, my improvement embodies a simple governor, which comprises a gear segment 317 secured to the side of the cam disc 279 by mounting it on the stud 308, previously referred to, and on a stud 318, the latter being provided with a threaded end and a nut 319 (see Fig. 8) for securing the gear segment 317 in position on the cam disc 279. The gear segment 317 is adapted to engage a pinion 320, rotatably mounted on a stud 321, projecting laterally from the frame side plate 6, as indicated in Figs. 4 and 8 of the drawings. The pinion 320 is secured to a brake drum 322, which carries a brake band 323, secured at one end to a pin 324, projecting inward from a relatively heavy fly wheel 325, the latter being independently rotatable upon the outer end of the pinion stud 321. The brake band 323 extends around the brake drum 322 and, near its free end, is secured to a spring 326 the end of which is attached to the stud or pin 324, to which the fixed end of the brake band 323 is secured, substantially as shown in Fig. 5 of the drawings. By this arrangement, it will be seen that on the forward stroke of the handle, the action of the brake drum 322 on the brake band 323 will be such as to tend to stretch the spring 326, thereby relieving the clutching action, but on the return stroke, the direction of motion of the pinion 320 will be reversed and the friction pull of the brake drum 322 on the band 323 will be added to the pull of the spring 326 and thereby increase the frictional drive imparted to the fly wheel 325 to govern the return stroke of the handle accordingly.

*Printing the zeros.*—In my improved machine, it is found desirable to make no provision for automatic printing of the zeros to the right of a number set up in the keyboard, except by depression of zero keys, which are provided for this purpose. In prior machines, where the zeros are printed automatically, an exceedingly complicated mechanism is sometimes required to carry out the printing of the zeros to the right of a number set up and, in order to simplify my machine, no such mechanism is provided. In the well known 10-key type of adding and listing machine, it is well known that zeros to the right of a number must be set up by the operator, in order to place the number in proper denomination. Therefore, when so desired, the zeros can be set up on the keyboard on my machine, although they are not required for correct totaling of the numbers to be added.

When the zero keys are depressed the stop fingers 21 are in position to block any movement of the stop slides 86 and the adding sectors. The detent dogs 72 will be lifted, however, and the type segments will be moved forward one space by the springs 82 and 74 to bring the zeros on the type segments into printing position. This movement of the type segments is permitted by the pin and slot connection 80—81 between the type segments and the adding sectors 79, and takes place when the handle is rotated in the usual manner for the adding and printing operation.

I have, however, provided for printing the zeros in the units and tens places, which are ordinarily allotted to cents, and for this reason, the zeros in these denominations preferably should be printed. By thus providing for printing the zeros in the cents column, the zeros in these denominations will be printed at every stroke of the handle, if no numeral keys are depressed, and this means is utilized for indicating an idle stroke of the handle by printing two zeros on the strip of paper. The printing of the zeros in the cents column is provided for in my machine by cutting the stop edges of the lugs 71, on the units and tens driving elements 69, back by means of notches 327, as indicated in Figs. 32 and 33, thereby permitting the units and tens type segments to advance a unit distance each time the handle is operated, before engaging the ears 72 on the ends of the stop levers 37. This advance movement of the type segments 69—70, independently of the adding sectors 79, will be permitted by the pin and slot connections therebetween and under the action of the transfer springs 82 and driving springs 74, which as previously pointed out, tend to move the driving element type segments 69—70 forward relative to the adding sectors 79, the unit space required for transfer of the tens, upon the release of the driving elements 69 by movement of the pick-up bail 294, as indicated in Fig. 33. Obviously, arrangements can be made for printing all the zeros, but, in my improvement, it is preferable to allow for this zero movement only in connection with the type segments for if such movement were permitted for all the zeros, the zeros to the left of the numbers added would be printed.

It will be understood that the units adding sector 79 is never required to effect the transfer of the tens and for all practical purposes the spring 82 could be eliminated from the units adding unit. Furthermore, it will be seen that no carrying lever 116 is provided for the units adding sector. Preferably for this reason the rock shaft 121 is provided with a dead end notch 328, for engaging the nose 120 of the units adding sector, substantially as indicated in Fig. 7 of the drawings.

*Ribbon mechanism.*—To provide a satisfactory ribbon mechanism for machines of this type is a difficult problem, particularly as the space is limited and it is desirable to provide not only for the satisfactory feeding of the ribbon, but also to provide for the automatic reverse of the feed, which will not require any attention on the part of the operator. Therefore, in my improved machine, I have provided a particularly novel and simple ribbon mechanism, which comprises a bracket 329, mounted on the rear downwardly inclined portion of the cover casing 8 and secured thereto by suitable screws 330, as indicated in Fig. 4 of the drawings. The bracket 329 is provided with an upwardly extending side bar 331, provided with a laterally projecting rod or stud 332, forming the axle for a pair of ribbon spools 333 and 334, which are held in place thereon by suitably spaced sealing clips (not shown) and a screw 335 in the end of the axle rod 332, cooperating with a washer 336. The ribbon spools 333 and 334 are spaced apart on the axle 332 and mounted therebetween is a ribbon feed dog-rocker 337 (see Figs. 44 to 49) provided with a laterally projecting rock-arm 338. The rock arm 338 is provided with an ear 339 adapted to be engaged by a pin or stud 340, projecting from the left platen rock frame plate 142, substantially as shown in Figs. 3, 4 and 6 of the drawings. An upwardly projecting ear 341 on the dog rocker is provided with two feed dogs 342 and 343, pivotally mounted thereon, on a stud 344, the feed dogs being adapted to cooperate with ratchet teeth 345, formed on the peripheries of adjacent spool flanges of the ribbon spools 333 and 334, as indicated in Figs. 4, 44 and 47 of the drawings. The dog rocker 337 is provided with another outwardly projecting arm 346, provided with a hole 347 in the end thereof, in which a spring 348 is secured. The opposite end of the spring 348 is preferably secured to a laterally projecting lug 349 on the base of the bracket 329, as indicated in Figs. 44 and 47. The dog rocker spring 348 is adapted to restore the dog rocker to normal position, after it has been moved or rocked by engagement of the pin 340 on the platen frame with the dog rocker ear 339. The dog rocker 337 is further provided with a downwardly projecting stop finger 350 adapted to engage a transverse rod 351 to thereby limit the return movement of the dog rocker under the action of the spring 348. The dogs 342 and 343 are adapted to be urged toward the ratchet teeth 345 of the respective ribbon spools by means of springs 352 connected to the respective dogs and to the dog rocker 337, in the hole 347, as indicated in Fig. 46.

Detent dogs 353 are pivotally mounted at 354 in the ears of a small bracket 355, secured to the main ribbon supporting bracket 329, as indicated in Fig. 44, the detents being formed by laterally projecting pins 356, adapted to cooperate with the ratchet teeth 345, of the respective ribbon spools 333 and 334. Obviously, in feeding the ribbon in one direction or the other, only one of the feed pawls 342 or 343 will be in operation at a time and the ribbon spool not being so fed should be left free for independent rotation as the ribbon is fed by the action of the feed dog of the other spool. Therefore, the detent dogs 353 are provided with overhanging ends 357 adapted to lie above the laterally bent ends 358 of the respective dogs 342 and 343, so that when the dogs are lifted out of operative relation to the corresponding ribbon spools, the detents 353 associated therewith will also be lifted out of the field of the ratchet teeth 345, substantially as shown in Fig. 47. The detent dogs 353 are preferably resiliently held in cooperative relation with the feed dogs and ratchet teeth of the respective ribbon spools by means of suitable springs 359.

In order to provide means for holding one of the other of the ribbon feed dogs 342—343 out of operative engagement with its corresponding ribbon spool, a pair of cam plates 360 and 361 are preferably mounted upon the axle 332, one on each side of the dog rocker 337, as indicated in separated perspective in Fig. 49. The cam plate 360 is provided with a cam followed by a dwell at 362, cooperating with the bent end 358 of the feed dog 342, while the cam plate 361 is provided with a cam and dwell at 363 for cooperation with the bent end 358 of the feed dog 343, substantially as shown in perspective in Fig. 49. The two cam plates 360 and 361 are rigidly secured together by a tie rod 364, so that when one cam plate is moved by means of an outwardly projecting finger piece 365, formed as part thereof, the other will also be moved, and the arrangement is such that when the cam 363 is moved under its dog, the other cam 362 will be moved out from under its dog, thereby permitting the latter to operate in the ratchet teeth 345 of its ribbon spool, for feeding action of the ribbon, when the dog rocker 337 is operated. Obviously, the cam plates 360 and 361 should rock with the dog rocker 337, in order to maintain the respective dogs 342 and 343 in the respective operative or inoperative positions required for feeding the ribbon and, therefore, a detent, operating between the cam plates and the dog rocker 337, is preferably provided and may consist of a spring pressed pin 366 in the dog rocker 337, cooperating with two positioning holes 366ª, preferably located in the cam plate 360. When the cam plates are in the position shown in Figs. 45 and 48, the cam 362 is under the end 358 of the pawl 342 and it as well as its corresponding detent dog 356 are held out of cooperative relation with the ratchet teeth 345 of the ribbon spool 333. When the cam plates are shifted to the position shown in Fig. 47, the cam 363 will engage the end 358 of the pawl 343 and hold the latter and its corresponding detent dog out of operative relation to the ratchet teeth 345 of the upper spool 334, and the ribbon will be fed or wound onto the spool 333. The feeding action of the dog rocker 337 always takes place upon the return movement of the platen rock frame, under the action of the dog rocker spring 348, the return movement of the dog rocker being limited by engagement of the finger 350 with the shaft 351.

An automatic ribbon reverse is an exceedingly desirable feature, in machines of this character, for the machine may be operated indefinitely without requiring the operator to watch the ribbon and reverse the feed thereof when necessary. Therefore, in connection with my improved ribbon feed mechanism, I have provided an automatic reverse, which comprises means for automatically shifting the cam plates 360 and 361, under the feeding action of the dog rocker, when the latter is operated by the platen rock frame. For this purpose, ribbon following fingers 367 are pivotally mounted on the shaft 351, and the springs 359, previously referred to as connected with the detent dogs 353, are preferably secured to pins 368 in the hubs of the following fingers, substantially as shown in Fig. 45, so as to resiliently hold the respective following fingers in contact with the ribbon on the ribbon spools. In this manner, the following fingers 367 are adapted to move inward and outward as the ribbon on the respective spools decreases or increases in diameter, and this motion of the following fingers is utilized for moving dogs 369 and 370 respectively, which are provided with oppositely extending ears 371 and 372. The cam plates 360 and 361 are provided with operating fingers 374 and 373 respectively adapted to cooperate with the ears 371 and 372, when the latter are thrown into the paths thereof by movement toward the center of the spools of the associated following fingers 367. As will be seen in Fig. 49, the cam operating finger 373 is provided with a squared end, adapted to cooperate with the ear 371, while the cam finger 374 is provided with a hook end or notch 375 adapted to cooperate with the underside of the ear 372, when the latter is thrown outward into its path.

It will be recalled that the cam plates 360 and 361, carrying the respective operating fingers 374 and 373, are adapted to be rocked with the dog rocker 337, each time the latter is operated by the pin 340 on the platen rock frame. Hence, when the parts are in the position shown in Fig. 47, with the ear 371 moved outward so as to lie under the end of the operating finger 373, the parts are in position to reverse the feed when the rock arm 338 is operated by the pin 340. When this occurs, the dog rocker 337 will be moved downward substantially as shown in Fig. 48, but the cam plates 360 and 361 will be prevented from moving therewith by the engagement of the operating finger 373 with the dog ear 371; thus the cam plates will be shifted and the cam 362 will be brought into the position shown in Fig. 48 to lift the feed dog 342, thereby preventing feed of the corresponding ribbon spool, while the cam 361 will be withdrawn from support of the dog 343 and the latter, under the pull of its spring 352, will be brought into feeding relation with the corresponding ratchet teeth 345 of its ribbon spool, as indicated in Fig. 46. When the following finger 367 of the spool 333 reaches the position shown in Fig. 47, that is, when the spool becomes nearly empty, the corresponding dog 370 will be moved outward to bring its ear 372 into the notch 375 of the operating finger 374 carried by the cam plate 360 so that, upon the return movement of the dog rocker 337 from the position shown in Fig. 48, the spring 348 will restore the dog rocker to normal position, shown in Fig. 47, but the dog ear 372 will hold the cam plates 360 and 361 from movement with the dog rocker, thereby shifting the relative position therebetween and placing the cam 363 under the end of the dog 343, thus lifting the latter, and its cooperating detent dog 353, out of cooperative relation with the corresponding ratchet teeth 345 of the spool 334, to thereby again reverse the feed.

The ribbon 376 is preferably carried from the respective ribbon spools over a ribbon guide 377, which is mounted, by means of ears 378, on the rear downwardly slanting portion of the cover casing 8 substantially as shown in Fig. 2, the ears 378 being located in depressions 379 in the cover plate on the horizontal edge of the opening 11 therein. The ribbon guide 377 is secured to the casing 8 by suitable screws 380, so as to lie in a plane parallel to the printing line of the type segments 70. The ribbon 376 is adapted to pass through slots 381 and over right angled reversing edges 382, so that the ribbon will pass from one spool to the other and lie in parallel bands extending from the spools over the ribbon guide, the lower band of the ribbon passing over the printing line, so that it is adapted to be between the type and the paper when the platen is moved forward in the printing operation. The upper ribbon spool 334 of the ribbon mechanism is preferably provided with a small knob 383 (see Figs. 4 and 6) for manually winding the ribbon, when it is necessary to do so, for instance, in taking out an old ribbon and putting in a new one.

*Operation.*—The operation of the various mechanisms has been indicated in the description thereof, but it will be desirable to review briefly the general operation of the machine.

*Addition.*—In normal addition on the machine, the keys 19 are depressed in the keyboard according to the digits in the different denominations and, if zeros appear in the number and it is desired that they should be printed on the list, the corresponding zero keys should be depressed. Setting the respective keys will move the latch strips 28 toward the front of the machine and the set keys will be latched down thereby. The latch strips so moved will not return fully to normal position, thereby holding the associated stop levers 37 out of the paths of the detent lugs 71 of the respective adding units. The keyboard is what is called a "flexible" keyboard, and, therefore, if a key has been wrongly depressed in any column, the mere depression of the proper key will automatically release the wrongly depressed key, so that under the action of its spring 33, it will be restored to normal position.

After the number has been set up on the keyboard as described, the handle 196 is operated, thereby rotating the main handle shaft 68 and the associated control mechanisms. The first effect of operating the handle, for normal addition, is that the cam 205 on the cam plate 201 will engage the friction roller 206 and, as shown in Fig. 28, on the forward stroke of the handle, move the accumulator unit downward and hold the register wheel pinions 108 out of mesh with the adding sector racks 107. Thereafter the pick-up bail 294 is moved to the position shown in Fig. 14, thereby permitting differential movement of the respective adding units, according to the keys depressed. In this movement of the adding units under the pull of the driving springs 74, the stop slides 86 will move forward until the corresponding stops 87—95—96 engage the lower or tail ends 20—21 of the keys, to thereby position the type segments and adding sectors to correspond with the numbers set up in the keyboard. During this operation, the driving springs 74 are operative to move all the elements of the adding units, while the transfer springs 82 will cause a relative movement between the driving elements 69 and the adding sectors 79, to the extent of the unit space permitted by the pin and slot connections 80—81. Toward the end of the forward stroke, as shown in Figs. 14, 25 and 28, the platen will be brought into printing engagement with the positioned type segments 70, by the toggle action of the link or pitman 222, which, through the crank arm 227, rocks the platen rock frame 142, as previously described. The pressure of the platen against the type segments will be limited by the engagement of the depending finger 155 with the stop rod 156, as shown in Fig. 14.

The platen rock frame, in its movement to the printing point, that is, from the position shown in Fig. 2, to the position shown in Fig. 14, is adapted, by means of the stud 340, to operate the ribbon feed dog rocker 337—339, moving it downward to the position shown in Fig. 48, so that, upon the return stroke of the handle, when the platen is restored to normal position, the spring 348 will operate the ribbon mechanism for feed thereof.

On the forward stroke of the handle, the pick-up bail 294 is moved forward as described, by means of the cam slot in the cam plate 279 on the left side of the machine, engaging the roller 285 (Figs. 40 and 41) and moving the crank arm 286 inward. The latter, through the links 291, will rock the pick-up bail, as indicated in Figs. 42 and 43, and, at the end of the forward stroke of the handle, the resilient finger 297, by engaging the stud 292, will positively position the pick-up bail at the limit of its forward movement, as determined by the engagement of the stop finger 300 with the rod 91. During this final movement of the pick-up bail, any of the adding sectors 79 that may have been left in the position shown in Fig. 17, after transfer of the tens, will be moved back, as indicated in Fig. 14, so that the ears 119 of the carrying levers 116 may drop down in front of the detent fingers 120, thus restoring the transfer mechanism for the next transfer of the tens.

Upon the return stroke of the handle, the first step is to move the friction roller lever 207 over to the left, as shown in Fig. 30, thereby permitting the accumulator unit 110 to snap back to normal position, under the action of its spring 214. This places the register wheel pinions 108 again in mesh with the adding sector racks 107 for accumulation of the total. The pick-up bail 294, by the return movement of the cam plate 279 from the position shown in Fig. 42, will engage the noses 295 of the driving elements 69, and restore the adding units to normal position, as represented in Fig. 2, except as to adding sectors released for transfer of the tens. On the return stroke of the handle, the roller 221, on the cam disc 201, will, near the end of the stroke, engage the pin 51, as indicated in Fig. 31, and rock the universal bail 44 forward, to move the latch strips 28 and release any keys set in the keyboard.

The transfer of the tens is effected by the triggers 114, engaging the noses 115 (see Fig. 19) of the carrying levers 116, to the left of the respective register wheels accumulating more than nine, and moving them down to the position shown in Fig. 17, thereby lifting the ears 119 out of the field of the corresponding detent fingers 120. If the adding unit to the left is in normal position, that is, no number has been set up in that column of keys, the spring 82 will immediately move the adding sector 79 to the position shown in Fig. 17, thereby moving the corresponding register wheel an additional unit distance for the transfer of the tens. If, however, the corresponding adding unit has been advanced, as indicated in Fig. 14, it will be necessary to hold the carrying lever 116 in its actuated position until the corresponding adding unit has been returned to normal position, to thereby permit the adding sector 79 to assume the transfer position shown in Fig. 17. For this purpose, the latch pawls 127 are provided for latching the carrying levers 116 in actuated position and will retain them in this position until the next operation of the handle. On the succeeding operation of the handle, the accumulator unit is again withdrawn from cooperation with the adding sectors and the latches 127 will be lifted to release the carrying levers, by engagement of the latch pawls with the fixed bar or rod 133, substantially as shown in Fig. 14.

*Repeat.*—When it is desired to add the same number repeatedly, the repeat lever 52 is operated by the finger piece 58 and moved rearward to the position shown in Fig. 36, thereby lifting the pin 51 out of the field of the roller 221, so that, upon the return stroke of the handle, the rock bail 44 will not be operated to release the keys. During the repeat operation, or in fact on any operation of the handle, the locking bail 60 will drop into the notches 59 of the latch strips 28, as shown in Fig. 14, thereby preventing the depression of keys in the keyboard, as well as preventing release of any depressed keys. The locking bail 60, as previously described, will be lifted out of locking position, as shown in Fig. 15, by the pin 63 on the arm 302 engaging the lower end of the rock arm 62.

When the repeat operation is completed, the keys will be still in depressed position, unless the repeat lever 52 has been released prior to the last handle operation. If the keys still remain depressed, they may be released by a forward pull of the repeat key 58, which will first release the bail 46 and then engage the ear 57 and rock the releasing bail 44 forward, to move the latch strips 28 and release the keys. Thus, in one operation, the pin 51 can be restored to normal adding position and the keys released in the keyboard. Obviously, by a forward pull of the repeat key 58, when in the position shown in Fig. 2, any number erroneously set up in the keyboard can be released before operation of the handle.

*Sub-total.*—For securing a sub-total, the total key 253 is moved rearward, as indicated in Fig. 32 of the drawings, and held in this position while starting the operating handle forward, but, it will be remembered that the total should not be taken until after an idle stroke of the handle, for, as previously pointed out, if any of the adding sectors 79 are in the position shown in Fig. 17, which they will occupy after the transfer of the tens, the ear 105 on the bail 101 (see Fig. 1) will be moved rearward into the path of the depending finger 278, thereby preventing operation of the total key 253. However, by an idle stroke of the handle, the adding sectors 79 will be restored to the position shown in Fig. 18, which is obviously necessary to avoid any error in taking the total. When the total key is depressed, as shown in Fig. 32, the edge 272 on the total clearing lever 244 will engage the stud 67 and by rocking the bail 44 will release any set keys and lift the stop levers 37 so that all the adding units are free to advance when the handle is operated. At the same time the finger 254, at the lower extremity of the total clearing lever 244, will engage the pin 255 and move the friction roller 206, on the lever 207, out of the path of the cam 205, so that when the cam plate 201 is moved forward by operation of the handle, the register wheel pinions 108 will remain in mesh with the adding sector racks 107, so as to rotate the register wheels backward until, as shown in Fig. 33, the triggers 114 engage the flat faces of the noses 115 of the carrying levers 116. At the same time, the printing segments 70 will be positioned according to the total accumulated in the register wheels and, at the end of the forward stroke of the handle, the platen will be forced against the type segments to print the total.

Upon the return stroke of the handle, the register wheels will remain in engagement with the adding sectors and, hence, the register wheels will be rotated forward in the same manner as for addition, thus restoring the number previously accumulated, after printing the sub-total.

*Clearing.*—In order to clear the accumulators, the clearing key 260 is depressed and latched down as shown in Fig. 35, while, at the same time, operating the total key 253. Under these conditions, the operation of the mechanism, on the forward stroke of the handle, will be identical with that just described in connection with the sub-total, but, with the clearing key 260 depressed, the trip lever 256 will be engaged by the pin 268, on the return stroke of the handle, and as shown in Fig. 38, the total clearing lever 244 will then be moved clockwise, by engagement of the lever 256 with the stud 270. This clockwise movement of the total clearing lever 244 will force the cam edge 271 against the stud 211 and move the register wheels out of engagement with the adding sectors, as indicated in Fig. 39. Since the register wheels are withdrawn, while the triggers 114 are in zero position, that is, in contact with the flat sides of the noses 115 of the carrying levers, the register wheels are cleared after printing the total.

When the total clearing lever 244 is rocked clockwise by the trip lever 256, the stud 277 is brought into engagement with the key 260, as shown in Fig. 38, and the latter is moved to release the notch 266 and permit the restoration of the key to normal position. As previously pointed out, the clearing key 260 will move the lever 262 so that the character printing end 265 thereof will be brought into printing line with the type segments representing the total and print a dash following the total, thus indicating on the strip of paper that the clearing operation has been performed. When the total key 253 is operated either for the sub-total or the clearing operation, the cam edge 272, at the upper extremity of the total clearing lever 244, will engage the pin 67, and rock the bail 44 forward to release any keys that may be set in the keyboard and lift all the stop levers 37 so that all the adding units are free to be moved by their actuating springs when the handle is pulled forward. The bail 44 will be held in its forward position during the forward stroke of the handle by the total clearing lever 244 and this lever will be held in its shifted position, as shown in Fig. 35, by the locking pin 273 riding on the inner face of the locking plate 275. This obviously will prevent the setting of any numeral keys during the forward stroke of the handle. On the return stroke of the handle in the clearing operation, as shown in Fig. 38, the total clearing lever 244 will be held in the position shown, by engagement of the pin 274 with the outer face of the locking plate 275.

*Non-add.*—In my improved machine, as previously pointed out, no special non-add key is required for, if the clearing key 260 is depressed after a number has been set up on the keyboard, then on the forward stroke of the handle the machine will operate in the usual manner, but, on the return stroke of the handle the trip lever 256' will be brought into operation to move the total clearing lever 244 clockwise, that is, the same as described for the clearing operation, with the result that the accumulator unit is moved downward to withdraw the register wheels from the adding sectors, thereby preventing the accumulations of the number set up on the keyboard. The number, however, will have been printed in the usual manner unless the non-print key has been depressed.

*Non-print.*—It is frequently desirable to eliminate the printing operation and, for this purpose, a special non-print key 236 has been provided, which, when depressed, as shown in Fig. 29, will lift the stud 224, and the rear end of the pitman 222, so that the stud will clear the notch or open slot 226 in the lower extremity of the rock arm 227, thereby preventing rocking movement of the platen toward the type segments. The position of the end of the pitman 222, at the end of the forward stroke of the handle, when the non-print key is in depressed position, is shown in Fig. 29. Obviously, one advantage of operating the ribbon mechanism by means of the platen rock frame 142, is that when the non-print key is depressed, to cut out the printing of a number, operation of the ribbon mechanism is automatically eliminated at the same time.

While I have shown and described the preferred form of my improved portable adding and listing machine, it will be understood that I do not wish to be limited to the specific details shown and described, for, obviously, various modifications in the details of construction and various changes and adaptations in the mechanisms may be made, for the purpose of further simplifying and reducing the cost of construction or improving the action, without departing from the spirit and scope of the invention.

Features of invention shown in the drawings and description herein but not claimed are claimed in my divisional applications, Serial No. 208,578, filed July 26, 1927; Serial No. 216,672, filed August 31, 1927; Serial No. 224,616, filed October 7, 1927; Serial No. 284,100, filed June 9, 1928 and Serial No. 421,728, filed January 18, 1930.

What I claim is:

1. In a key-set adding machine, the combination with a main shaft on which adding sectors are rotatably mounted, of a handle secured to said shaft, a register wheel unit, a rock arm connected with said register wheel unit, a spring for normally holding the register wheel unit in engagement with the adding sectors, a cam disc rotatable with said main shaft for moving the register wheel unit to its disengaged position, a projection on said disc, a total clearing lever, a pin on said total lever normally out of the path of the said projection on the cam disc, a camming arm on the total lever adapted to engage a pin on said rock arm for moving said register wheels out of engagement with the adding sectors, a lug on the total lever to prevent the operation of the total clearing lever when any one of the adding sectors is out of normal position and in its carry-over position, said latter lug permitting a limited movement of the total lever to bring the pin on the total lever into the path of the projection on the disc to lock the handle-operated mechanism against movement; and a clearing key with connections to the total clearing lever to move said lever to bring the camming arms into operation when all of the adding sectors are in their normal positions.

2. The combination of an adding sector, a register wheel, a rock frame supporting said register wheel, a spring normally holding said rock frame with the register wheel in engagement with the adding sector, a rock arm connected to said rock frame, a handle operated cam disc, a lever pivoted on said rock arm and carrying a roller, a spring connected to said lever and to the rock arm normally holding said lever against a stop with the roller in position to be engaged by the said cam disc on the forward stroke of the handle to force the register wheel out of engagement with the adding sector without moving the lever on its pivot; and means to cause the lever to turn on its pivot to swing the roller out of the path of the cam disc at the beginning of the return stroke of the handle to thereby permit the register wheel to immediately snap back into engagement with the adding sector, the cam disc being shaped to permit the pivoted lever to snap back to normal position on completion of the return stroke of the handle.

3. The combination of an adding sector, a register wheel, a rock frame supporting said register wheel, a spring normally holding said rock frame with the register wheel in engagement with the adding sector, a rock arm connected to said rock frame, a handle operated cam disc, a lever pivoted on said rock arm and carrying a roller, a spring connected to said lever and to the rock arm normally holding said lever against a stop with the roller in position to be engaged by the said cam disc on the forward stroke of the handle to force the register wheel out of engagement with the adding sector without moving the lever on its pivot; means to cause the lever to turn on its pivot to swing the roller out of the path of the cam disc at the beginning of the return stroke of the handle to thereby permit the register wheel to immediately snap back into engagement with the adding sector, the cam disk being shaped to permit the pivoted lever to snap back to normal position on completion of the return stroke of the handle, and a total clearing lever adapted to move said pivoted lever to swing the said roller out of the path of the cam disc on the forward stroke of the handle thereby to permit the register wheel to remain in engagement with the adding sector.

4. The combination with a main shaft, an adding sector, a rock arm connected with a register wheel unit, a spring normally holding the register wheel unit in engagement with the adding sector; a handle operated cam disc, a lever pivoted on said rock arm and carrying a roller, a spring connected to said lever and to the rock arm normally holding said lever against a stop with the roller in position to be engaged by said cam disc on the forward stroke of the handle to force the register wheel unit to inoperative position, a total clearing lever, a total key for moving said total clearing lever, an arm on said total clearing lever to swing the roller lever on its pivot to inoperative position when the total key is operated; an arcuate locking plate carried by the cam disc; a pin on the total clearing lever adapted to engage the inner side of said locking plate on the forward stroke of the handle to lock the total clearing lever in position to hold the said roller out of the path of the cam disc, the said arcuate plate being free of said pin at the end of the forward stroke of the handle to permit the total clearing lever to return to normal position.

5. The combination with a shaft, an adding sector rotatably mounted thereon, a handle connected thereto, a register wheel unit, driving racks, a rock arm connected to said unit, a spring normally holding the said unit in operative position, key-controlled stop levers, a rock bail, a pin on said rock bail, a lever pivoted on the rock arm and carrying a roller, a cam disc on the main shaft to engage the said roller on the forward stroke of the handle, a total clearing lever provided with a cam at its upper end to engage the pin on the rock bail, and with a cam at its lower end to engage the rock arm, and also with an arm at its lower end to engage the lever to swing the roller out of the path of the cam disc, and further provided with a stud, a total key for moving the total clearing lever to cause its cam to engage the pin on the rock bail and its arm to swing the roller carrying lever, a trip lever normally inoperative, a pin on the cam disc adapted to engage the trip lever on the return stroke of the handle to force the said trip lever into engagement with the stud on the total clearing lever, a clearing key with connections to the trip lever to set said lever in the path of the pin on the cam disc.

6. In a key-set adding machine, the combination of a cam disc, a total clearing lever provided with a cam at its upper end adapted to release driving racks, and with a cam at its lower end to move an accumulator unit to inoperative position, and with an arm at its lower end to engage and disable an accumulator shifting means, and further provided with a stud, a total key for moving the total clearing lever to cause the cam at its upper end to release the driving racks and the arm at its lower end to disable the accumulator shifting means during the operative stroke of the cam disc, settable means operable by the cam disc on its return stroke to engage the stud on the total clearing lever and cause the cam at the lower end thereof to move the accumulator unit to inoperative position.

In testimony whereof I hereunto affix my signature.

GLENN J. BARRETT.